United States Patent
Kakizaki et al.

(10) Patent No.: US 9,649,907 B2
(45) Date of Patent: May 16, 2017

(54) VEHICLE AIR-CONDITIONER

(75) Inventors: Shinji Kakizaki, Saitama (JP); Junichi Kanemaru, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 198 days.

(21) Appl. No.: 13/456,603

(22) Filed: Apr. 26, 2012

(65) Prior Publication Data

US 2013/0283840 A1    Oct. 31, 2013

(51) Int. Cl.
*F25D 21/06* (2006.01)
*B60H 1/00* (2006.01)

(52) U.S. Cl.
CPC ............ *B60H 1/00064* (2013.01); *B60H 2001/00085* (2013.01); *B60H 2001/00099* (2013.01); *B60H 2001/00135* (2013.01)

(58) Field of Classification Search
CPC ........... B60H 1/00664; B60H 1/00671; B60H 1/00864; B60H 1/00835; B60H 1/00842; B60H 1/00064; B60H 2001/00099; B60H 2001/00085; B60H 2001/00135; B60H 1/00849
USPC ............ 62/239, 244, 80, 276; 165/202, 204
See application file for complete search history.

(56) References Cited

U.S. PATENT DOCUMENTS

| | | | | |
|---|---|---|---|---|
| 4,289,195 A | * | 9/1981 | Bellot | B60H 1/00064 165/204 |
| 4,346,729 A | * | 8/1982 | Franz | B60H 1/00442 137/353 |
| 4,412,425 A | * | 11/1983 | Fukami | B60H 1/00007 454/161 |
| 4,537,245 A | * | 8/1985 | Nishimura | B60H 1/00842 165/203 |
| 4,570,450 A | * | 2/1986 | Takemi | B60H 1/00864 62/199 |
| 4,702,307 A | * | 10/1987 | Ito | B60H 1/00857 165/42 |
| 4,718,244 A | * | 1/1988 | Kobayashi | B60S 1/54 236/44 C |

(Continued)

FOREIGN PATENT DOCUMENTS

| | | |
|---|---|---|
| DE | 19838174 A1 | 3/1999 |
| JP | H05178079 A | 7/1993 |

(Continued)

OTHER PUBLICATIONS

Office Action issued on May 22, 2013 in counterpart European Application 13 158 601.8.

(Continued)

*Primary Examiner* — Len Tran
*Assistant Examiner* — Kirstin Oswald
(74) *Attorney, Agent, or Firm* — Carrier Blackman & Associates, P.C.; Joseph P. Carrier; Jeffrey T. Gedeon

(57) ABSTRACT

A vehicle air conditioner includes a first passage and a second passage and is capable of operating in such a manner that outside air introduced in the first passage is conditioned by an evaporator and a heater core and subsequently blown, as a conditioned air, from a defrost outlet, side defrost outlet and side vent outlet toward windowpanes and, at the same time, inside air introduced in the second passage is conditioned by the evaporator and the heater core and subsequently blown, as a conditioned air, from a center vent outlet and front and rear heat outlets into a passenger compartment.

7 Claims, 19 Drawing Sheets

(56) References Cited

U.S. PATENT DOCUMENTS

| | | | | |
|---|---|---|---|---|
| 4,759,269 A | * | 7/1988 | Brown | G05D 23/1917 165/217 |
| 4,762,169 A | * | 8/1988 | Andersen | B60K 37/06 165/203 |
| 4,783,970 A | * | 11/1988 | Takahashi | B60H 1/3207 62/176.3 |
| 4,819,715 A | * | 4/1989 | Kobayashi | B60H 1/00842 165/203 |
| 4,895,000 A | * | 1/1990 | Takahashi | B60H 1/3207 165/202 |
| 4,916,913 A | * | 4/1990 | Narikiyo | F24F 3/001 236/49.3 |
| 4,953,630 A | * | 9/1990 | Iida | B60H 1/00842 165/231 |
| 5,016,704 A | * | 5/1991 | Ono | B60H 1/00064 165/137 |
| 5,113,748 A | | 5/1992 | Shibuya | |
| 5,156,204 A | * | 10/1992 | Doi | B60H 1/00842 165/204 |
| 5,181,553 A | * | 1/1993 | Doi | B60H 1/00842 165/203 |
| 5,211,604 A | * | 5/1993 | Fujiki | B60H 1/00021 454/144 |
| 5,257,736 A | * | 11/1993 | Roy | F24F 7/08 165/232 |
| 5,277,038 A | * | 1/1994 | Carr | B60H 1/00492 165/10 |
| 5,309,731 A | * | 5/1994 | Nonoyama | B60H 1/00849 62/244 |
| 5,390,728 A | * | 2/1995 | Ban | B60H 1/00742 165/202 |
| 5,860,593 A | * | 1/1999 | Heinle | B60H 1/0075 165/204 |
| 6,371,202 B1 | * | 4/2002 | Takano | B60H 1/00914 165/202 |
| 6,607,029 B2 | * | 8/2003 | Danieau | B60H 1/00021 165/203 |
| 2002/0084058 A1 | * | 7/2002 | Ozeki | B60H 1/0005 165/42 |
| 2003/0000691 A1 | * | 1/2003 | Kim | B60H 1/00064 165/203 |
| 2005/0205247 A1 | * | 9/2005 | Ezaki | B60H 1/00028 165/204 |
| 2005/0230096 A1 | * | 10/2005 | Yamaoka | 165/202 |
| 2006/0021424 A1 | * | 2/2006 | Ishikawa et al. | 73/118.2 |
| 2010/0043470 A1 | * | 2/2010 | Kang | B60H 1/00064 62/239 |
| 2010/0304654 A1 | | 12/2010 | Kakizaki et al. | |
| 2011/0036117 A1 | | 2/2011 | Frohling et al. | |

FOREIGN PATENT DOCUMENTS

| | | |
|---|---|---|
| JP | H0858359 A | 3/1996 |
| JP | H09156348 A | 6/1997 |
| JP | 10-109520 A | 4/1998 |
| JP | 2011121430 A | 6/2011 |

OTHER PUBLICATIONS

Office Action issued on Jul. 15, 2014 in counterpart Japanese Application 2013-027981.

Office Action issued Dec. 18, 2014 in counterpart Chinese Application 201310163622.1.

* cited by examiner

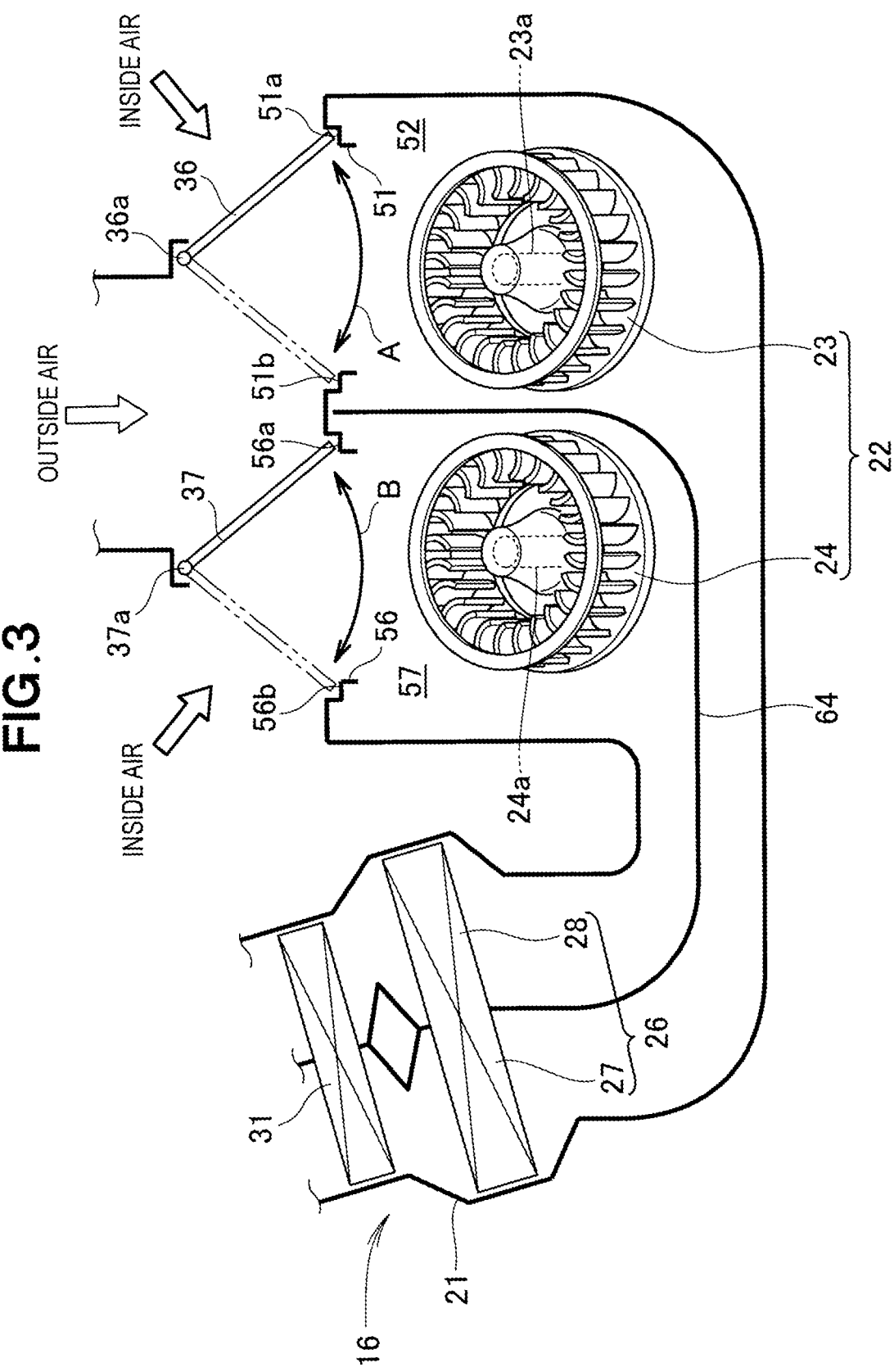

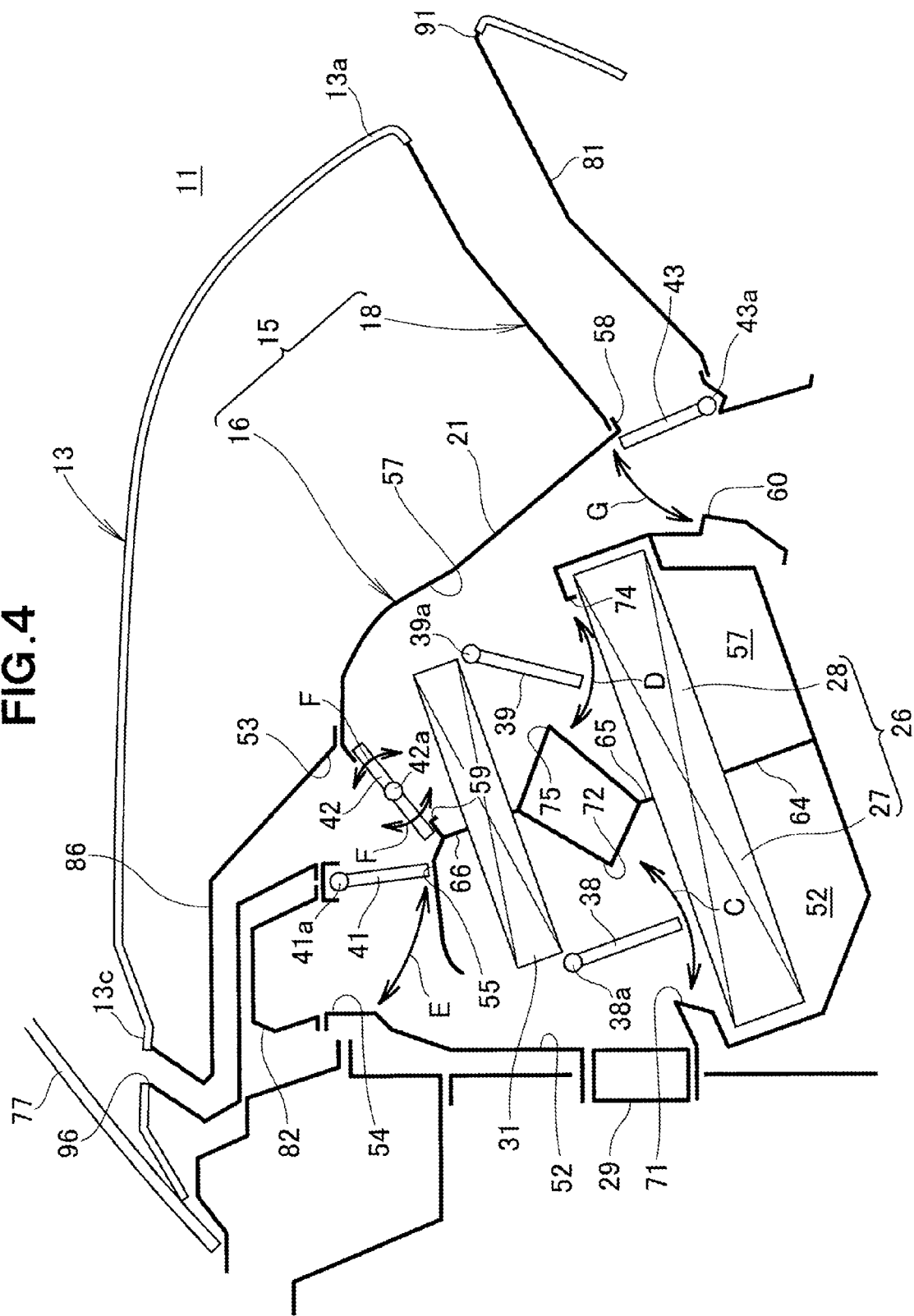

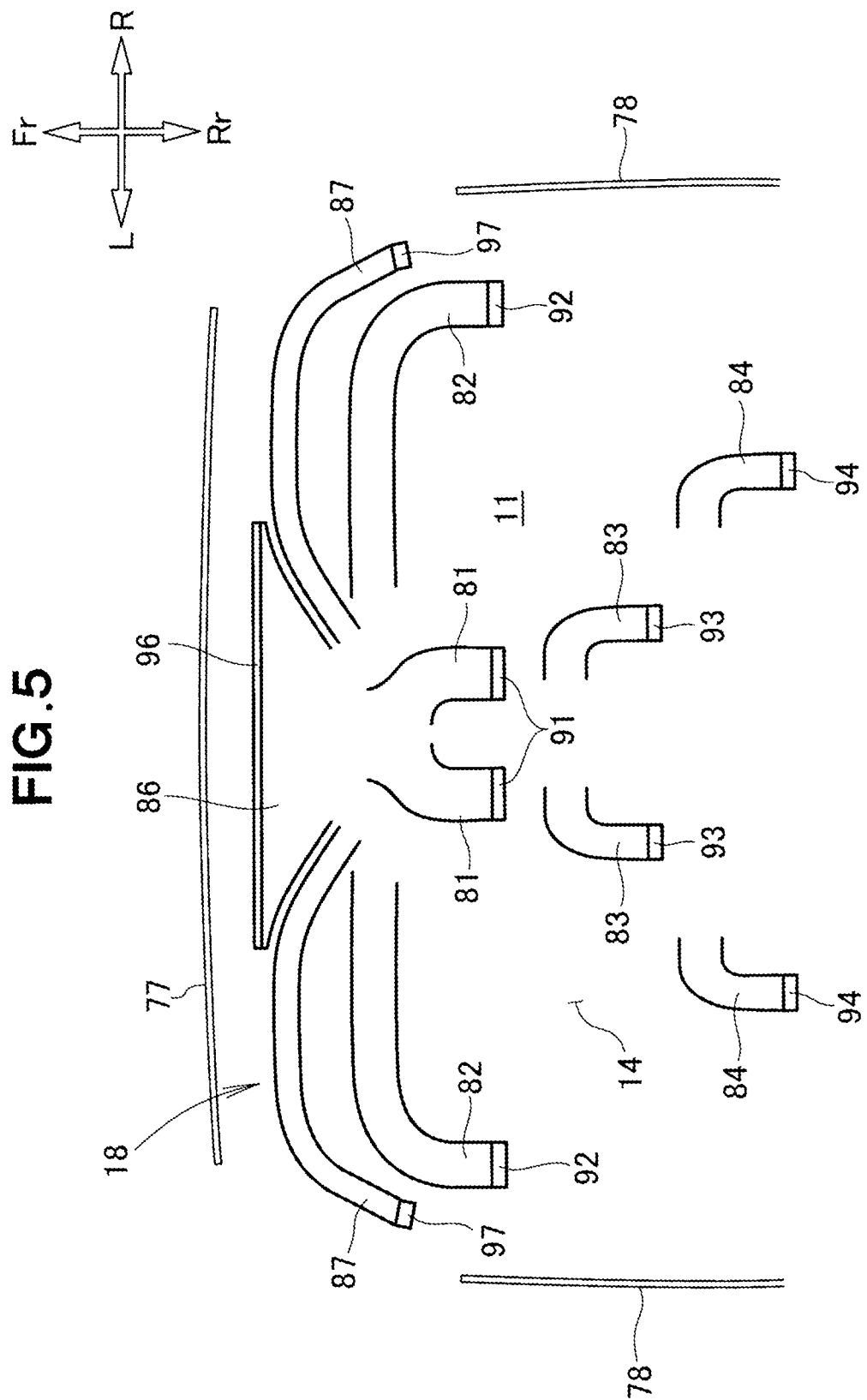

VEHICLE AIR-CONDITIONER

FIELD OF THE INVENTION

The present invention relates to a vehicle air-conditioner capable of introducing air from outside a vehicle passenger compartment (outside air) and air from inside the vehicle passenger compartment (inside air) to generate conditioned air and blowing the conditioned air into the vehicle passenger compartment.

BACKGROUND OF THE INVENTION

Some known vehicle air-conditioners include an outside air passage and an inside air passage that are provided separately for guiding outside air and inside air, respectively. In a heat mode or a heat/defrost mode, the known vehicle air-conditioners circulate the inside air, having been already heated within a passenger compartment of the vehicle, through the inside air passage and blow the circulated inside air from heat outlets as a conditioned air to thereby heat the passenger compartment at a proper temperature. At the same time, the outside air is introduced into the outside air passage to generate a conditioned air having a low level of humidity and the conditioned air is blown from defrost nozzles toward windowpanes to keep good antifogging property of the windowpanes.

By virtue of the outside air passage and the inside air passage that are provide separately, the known vehicle air-conditioners are able to improve passenger-compartment heating power or capacity and secure good windowpane anti-fogging property in the heat mode or the heat/defrost mode. One example of such known vehicle air-conditioners is disclosed in Japanese Patent No. 3684712 corresponding to Japanese Patent Application Laid-open Publication (JP-A) No. 10-109520.

However, when a bi-level mode or a heat mode is selected, the disclosed vehicle air-conditioner is not able to blow the outside air and the inside air concurrently, via the outside air passage and the inside air passage, respectively, into the passenger compartment while it is operating in a normal stable stat. The term "normal stable state" is used herein to refer to a state in which the volume of conditioned air blown into the passenger compartment and the temperature of the passenger compartment are set in an intermediate range.

Thus, while the disclosed vehicle air-conditioner is operating in the normal stable state in the bi-level mode or the hat mode, one of the outside air and the inside air is solely used to generate conditioned air to be blown into the passenger compartment. This arrangement makes it difficult to achieve a good balance between passenger-compartment temperature comfort and windowpanes anti-fogging property. To deal with this problem, during a normal stable state operation, the conditioned air generated solely from the outside air or inside air is heated or cooled before being blown into the passenger compartment. Such additional heating or cooling will increase energy consumption of the vehicle air-conditioner.

SUMMARY OF THE INVENTION

It is, therefore, an object of the present invention to provide a vehicle air-conditioner, which is capable of securing a good balance of passenger-compartment temperature comfort and windowpanes anti-fogging property, and also achieving a reduction in energy consumption.

According to one aspect of the present invention, there is provided an air-conditioner for a vehicle, comprising: a first air inlet for selectively introducing outside air from outside a passenger compartment of the vehicle and inside air from inside the passenger compartment; a second air inlet for selectively introducing the inside air and the outside air; a first passage communicating with the first air inlet and capable of communicating to a defrost outlet, a side defrost outlet and a side vent outlet; a second passage communicating with the second air inlet and capable of communicating to a center vent outlet and a heat outlet; and an evaporator and a heater core disposed in the first and second passages in the named order as viewed from the first and second air inlets, wherein the air-conditioner is capable of operating in plural different modes, and in at least one of the plural different modes, the outside air introduced from the first air inlet into the first passage is conditioned by the evaporator and the heater core and subsequently blown, as a first conditioned air, from the defrost outlet, side defrost outlet and side vent outlet toward windowpanes of the vehicle, and the inside air introduced from the second air inlet into the second passage is conditioned by the evaporator and the heater core and subsequently blown, as a second conditioned air, from the center vent outlet and heat outlet into the passenger compartment. While the vehicle air-conditioner is in operation, the inside air which is already kept at a proper temperature within the passenger compartment is circulated through the second passage and blown, as a conditioned air, from the respective outlets (center vent outlet and heat outlet) into the passenger compartment. By thus blowing the conditioned air into the passenger compartment, the degree of air-conditioning (i.e., cooling or heating condition) can be adjusted efficiently with improved accuracy. Furthermore, while the vehicle air-conditioner is in operation, outside air introduced from outside the passenger compartment and having a low level of humidity or a conditioned outside air is blown, as a conditioned air, from the defrost outlet, side defrost outlet and side vent outlet toward the windowpanes. By thus blowing the conditioned air toward the windowpanes, the windowpanes can be prevented from becoming fogged.

By virtue of the provision of the first and second passages, it is possible to circulate the inside air during operation of the vehicle air-conditioner so that the passenger compartment is always kept in a comfortable condition. Concurrently at the same time, a fog-free state of the windowpanes can be maintained by introducing the outside air. Thus, a good balance between temperature comfort of the passenger compartment and anti-fogging properties of the windowpanes can be achieved during operation of the vehicle air-conditioner. This will eliminate undue heating and cooling of the passenger compartment by the conditioned air blown into the passenger compartment and, hence, energy consumption of the vehicle air-conditioner can be reduced.

Preferably, the air-conditioner further includes a first fan disposed in the first passage and located between the first air inlet and the evaporator, and a second fan disposed in the second passage and located between the second air inlet and the evaporator, wherein the first fan and the second fan are individually supported on respective driving shafts.

With this arrangement, switching between a start-up operation and a stopping operation or adjustment of the rotational speeds of the respective fans can be achieved for each individual fan. This will ensure that when the windowpanes are in a condition to start fogging up while the air-conditioner is operating, the volume of conditioned air to be blown toward the windowpanes can be accurately adjusted by adjusting the rotational speed of the fans. Additionally, since the first fan is disposed in the first passage and the second fan is disposed in the second passage, it is possible to prevent air leakage between the two fans. This will increase the reliability in maintaining a good balance between temperature comfort of the passenger compartment and anti-fogging properties of the windowpanes, and contributes to a further reduction in energy consumption of the vehicle air-conditioner.

Preferably, the evaporator is mounted to tilt in a backward direction of the vehicle, and the tilted evaporator includes a lower half disposed in the first passage and an upper half disposed in the second passage. This arrangement is employed for a reason described below.

The first passage is in communication with the defrost outlet, side defrost outlet and side vent outlet, while the second passage is in communication with the center vent outlet and heat outlet. With this arrangement, while the vehicle air-conditioner is in operation, it may occur with higher frequency that the inside air is introduced into the second passage, and the outside air is introduced into the first passage in order to avoid fogging of the windowpanes.

In this instance, because the humidity of the outside air is normally higher than that of the inside air, if the humid outside air is guided onto the upper half of the evaporator, water vapor contained in the outside air will become condensed on a tube and fins of the evaporator upper half. The condensed water then flows downward from the evaporator upper half to the lower half of the evaporator along the pipe and fins of the evaporator. Thus, in the case where the vehicle air-conditioner is operating with a low blow-out air volume, the condensed water may freeze on the tube and fins of the evaporator as it flows downward from the evaporator upper half toward the evaporator lower half.

To avoid the occurrence of this problem, the evaporator upper half is disposed in the first passage, so that condensed water, which has been removed from the outside air, can smoothly fall by gravity down from the evaporator without freezing on the tube and fins of the evaporator. The evaporator is thus free from adhesion of frozen water and, hence, the outside air and inside air can pass through the evaporator smoothly with reduced resistance. This will achieve a reduction in energy consumption of the vehicle air-conditioner.

BRIEF DESCRIPTION OF THE DRAWINGS

One preferred structural embodiment of the present invention will be described in detail herein below, by way of example only, with reference to the accompanying sheets of drawings, in which:

FIG. 3 is a diagrammatical view showing the relation between a fun means and an evaporator of the vehicle air-conditioner;

FIG. 4 is an enlarged view of a portion of FIG. 2.

FIG. 5 is a schematic plan view showing an arrangement of a duct unit of the vehicle air-conditioner;

DETAILED DESCRIPTION OF THE PREFERRED EMBODIMENT

Figure 1:
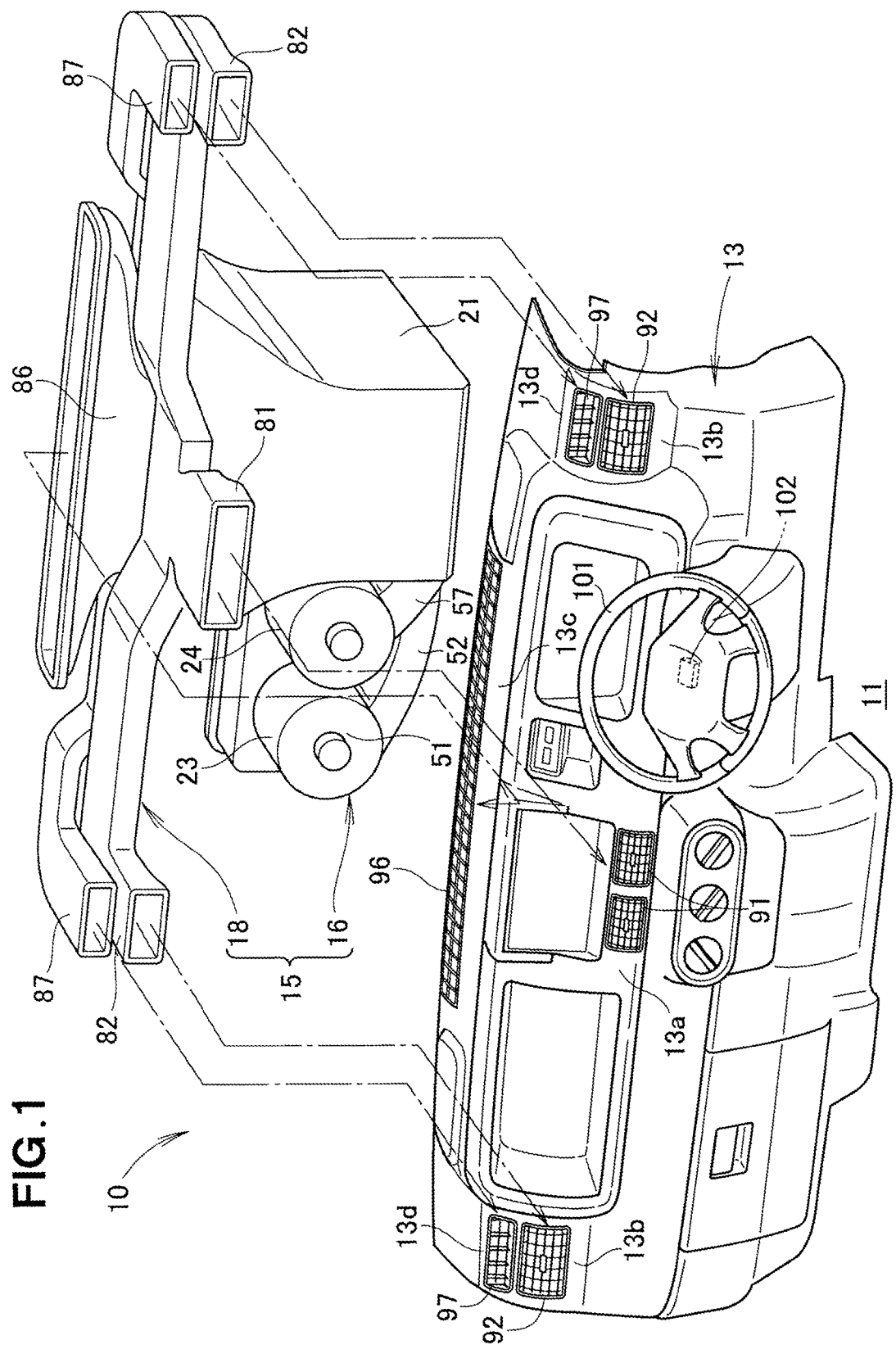
FIG. 1 is an exploded perspective view of a vehicle air-conditioner embodying the present invention as it is removed from an instrument panel of the vehicle.

Referring now to the drawings and FIG. 1 in particular, there is shown a general configuration of a vehicle air-conditioner according to one preferred embodiment of the present invention. As shown in FIG. 1, a vehicle 10 includes a passenger compartment 11, an instrument panel 13 that partitions a front part of the passenger compartment, and a vehicle air-conditioner 15 disposed forwardly of the instrument panel 13 as viewed in a longitudinal or front-rear direction of the vehicle.

The vehicle air-conditioner 15 includes an air-conditioning unit 16 installed in the vehicle 10 for performing air-conditioning of the interior of the passenger compartment 11, and a duct unit 18 provided on the air-conditioning unit 16.

Figure 2:
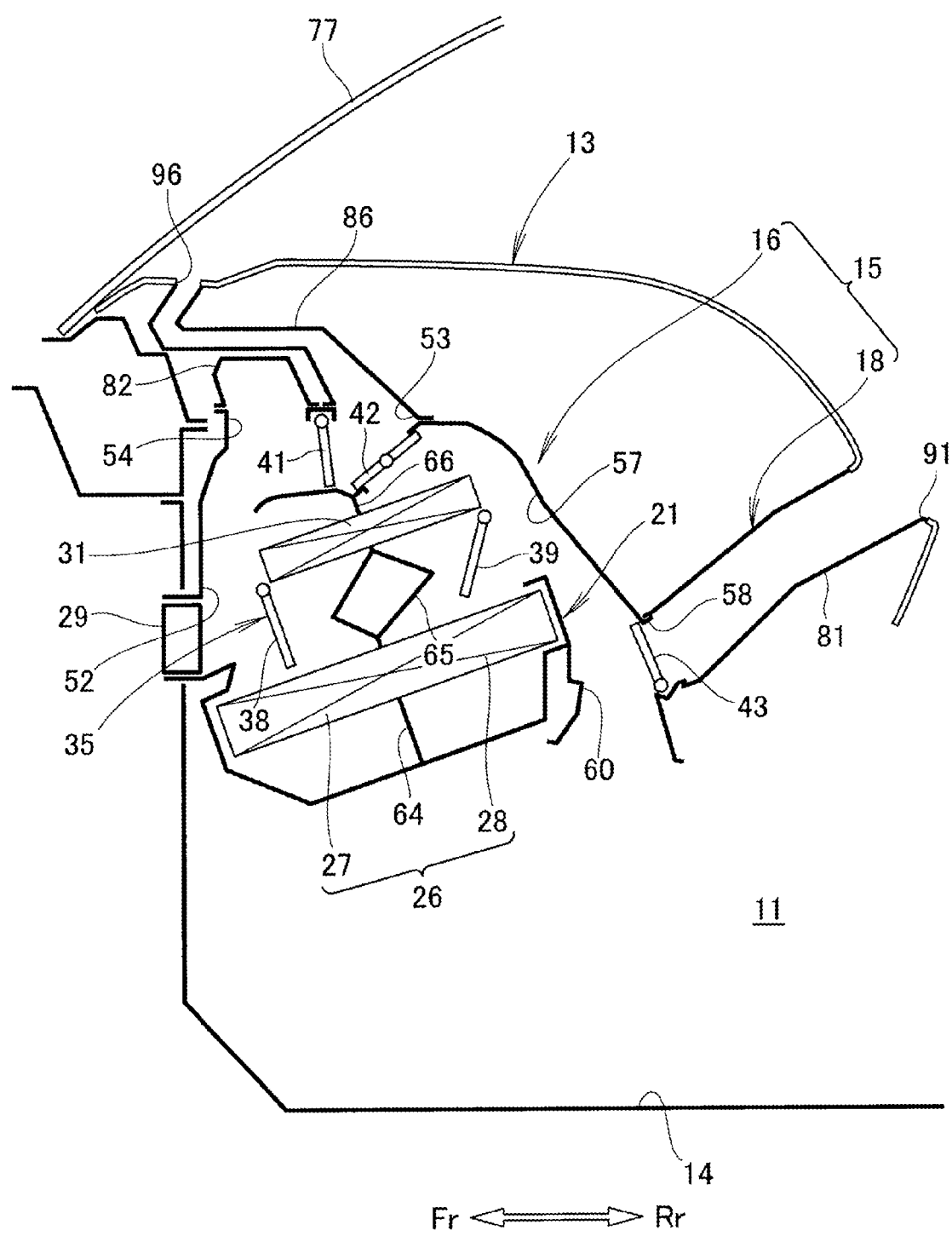
FIG. 2 is a schematic cross-sectional view of the vehicle air-conditioner.

As shown in FIGS. 2 and 3, the air-conditioning unit 16 generally comprises a housing 21 disposed on a front part of the passenger compartment 11, a fan means or device 22 disposed in the housing 21, an evaporator 26 and a heater core 31 that are disposed downstream of the fan device 22, and a damper means or device 35 disposed in the housing 21 for regulating the flow of air inside the housing 21.

The housing 21 has a first air inlet 51 for introducing outside air, a first passage 52 communicating with the first air inlet 51, a defrost inlet (DEF inlet) 53 and a side vent inlet 54 that are in communication with the first passage 52, a second air inlet 56 for introducing inside air, a second passage 57 communicating with the second air inlet 56, and a center vent inlet 58 and a front and rear heat inlet 60 that are in communication with the second passage 57. The first passage 52 and the second passage 57 are defined by a first partition wall 64, a second partition wall 65 and a third partition wall 66 within the housing 21.

The DEF inlet 53 and the side vent inlet 54 are disposed above and forwardly of the heater core 31. The center vent inlet 58 and the front and rear heat inlet 60 are disposed rearwardly of the evaporator 26 and the heater core 31 as viewed in the longitudinal direction of the vehicle body. The first partition wall 64, the second partition wall 65 and the third partition wall 66 will be described later in detail.

The fan device 22 (FIG. 3) includes a first fan 23 disposed in the first passage 52 and located downstream of the first air inlet 51, and a second fan 24 disposed in the second passage 57 and located downstream of the second air inlet 56.

The first fan 23 is disposed between the first air inlet 51 and the evaporator 26 (especially, a lower half 27 of the evaporator 26) and supported on a drive shaft 23a of a first fan motor (not shown). The lower half 27 of the evaporator 26 will be hereinafter referred to for brevity as "evaporator lower half". By rotating the first fan 23 by the drive shaft 23a, the outside air or the inside air is drawn or introduced from the first air inlet 51 into the first passage 52 and subsequently guided downstream toward the evaporator lower half 27. The number of rotations of the first fan 23 can be adjusted by regulating voltage applied to the first fan motor.

The second fan 24 is disposed between the second air inlet 56 and the evaporator (especially, an upper half 28 of the evaporator 26) and supported on a drive shaft 24a of a second fan motor (not shown). The upper half 28 of the evaporator 26 will be hereinafter referred to for brevity as "evaporator upper half". By rotating the second fan 24 by the second drive shaft 24a, the inside air or the outside air is drawn or introduced from the second air inlet 56 into the second passage 57 and subsequently guided downstream toward the evaporator upper half 28. The number of rotations (i.e., rotational speed) of the second fan 24 can be adjusted by regulating voltage applied to the second fan motor.

Thus, the first and second fans 23 and 24 of the fan device 22 are separately supported by the respective drive shafts 23a, 24a. Accordingly, switching between an operating state and a stopped state and adjustment of the rotational speed of the first and second fans 24 can be achieved for each individual fan.

The evaporator 26 has the evaporator lower half 27 disposed in the first passage 52 downstream of the first fan 23, and the evaporator upper half 28 disposed in the second passage 57 downstream of the second fan 24. The evaporator 26 tilts backward of the vehicle body so that the evaporator lower half 22 including a lower end of the evaporator 26 is located forwardly of the evaporator upper half 28 including an upper end of the evaporator 26.

The evaporator 26 has the same structure as an evaporator commonly used in a conventional air-conditioning unit. Stated more specifically, when a compressor (not shown) of the air-conditioning unit 16 is driven, a refrigerant is fed in a gaseous phase to a condenser (not shown). The thus fed refrigerant is cooled by the condenser and fed in a liquid phase to an expansion valve 29 (FIG. 2). The refrigerant is decompressed by the expansion valve 29 and thereafter fed to the evaporator 26.

By thus supplying the refrigerant in a decompressed state to the evaporator 26, the outside air or the inside air that has been guided into the first passage 52 by the first fan 23 can be cooled by the evaporator lower half 27, while, at the same time, the outside air or the inside air that has been guided into the second passage 57 by the second fan 24 can be cooled by the evaporator upper half 28.

The heater core 31 is disposed downstream of the evaporator 26 and has a lower half (not designated) disposed in the first passage 52 and an upper half (not designated) disposed in the second passage 57. Thus, in the first passage, the evaporator lower half 27 and the lower half of the heater core 31 are disposed in the order named on a downstream side of the first air inlet 51. Similarly, in the second passage 57, the evaporator upper half 28 and the upper half of the heater core 31 are disposed in the order named on a downstream side of the second air inlet 56.

The heater core 31 is disposed above the evaporator 26 and spaced from the evaporator 26 by a predetermined distance. The heater core 31 is disposed substantially parallel to the evaporator 26. With this arrangement, the heater core 31 tilts backward of the vehicle body so that a lower end of the heater core 31 including the lower half thereof is located forwardly of an upper end including the upper half of the heater core 31. The heater core 31 is configured in the same manner as a heater core normally used in a conventional air-conditioning unit. The outside air or the inside air, which has been cooled (or conditioned) by the evaporator 26 (and more particularly, the evaporator lower half 27 and the evaporator upper half 28) can be heated by the heater core 31 as the outside air or the inside air is guided onto the heater core 31 by first and second cooling/heating switching dampers 38 and 39.

The outside air or the inside air that has been cooled or conditioned by the evaporator (i.e., the evaporator lower half 27 and/or the evaporator upper half 28) and the outside air or the inside air that has been heated or conditioned by the heater core 31 are referred to as "conditioned air".

As described above, the evaporator 26 and the heater core 31 tilt in a backward direction of the vehicle body. Furthermore, the DEF inlet 53 and the side vent inlet 54 are disposed above and forwardly of the heater core 31, and the center vent inlet 58 and the front and rear heat inlet 60 are disposed rearwardly of the evaporator 26 and the heater core 31 as viewed in the longitudinal direction of the vehicle body.

With this arrangement, an upstream side of the evaporator 26 is divided by the first partition wall 64 into the first passage 52 and the second passage 57. The first passage 52 has the evaporator lower half 27 disposed therein, and the second passage 57 has the evaporator upper half 28 disposed therein. The evaporator lower half 27 is disposed downstream of the first fan 23, and the evaporator upper half 28 is disposed downstream of the second fan 24.

The evaporator 26 tilts backward and hence has an inclined position sloping downward toward a forward direction of the vehicle body, and the evaporator lower half 27 is disposed in the first passage 52 while the evaporator upper half 28 is disposed in the second passage 52 for a reasons which will be discussed below.

The first passage 52 communicates with a defrost outlet 96, right and left side defrost outlets 97, and right and left side vent outlets 92. The second passage 57 communicates with a pair of laterally juxtaposed center vent outlets 91, right and left front heat outlets 93, and right and left rear heat outlets 94 (FIG. 5). During operation of the vehicle air-conditioner 15, it may occur with higher frequency that the inside air is introduced into the second passage 57, and the outside air is introduced into the first passage 52 in order to avoid fogging of a windshield 77 or side windowpanes 78, 78 (FIG. 5).

In this instance, because the humidity of the outside air is normally higher than that of the inside air, if the humid outside air is guided onto the evaporator upper half 28, water vapor in the outside air will become condensed on a tube and fins of the evaporator upper half 28. The condensed water then flows downward from the evaporator upper half 28 to the evaporator lower half 28 along the pipe and fins of the evaporator 26. Thus, in the case where the vehicle air-conditioner 15 is operating with a low blow-out air volume, the condensed water may freeze on the tube and fins of the evaporator 26 as it flows downward from the evaporator upper half 28 toward the evaporator lower half 27.

To avoid the occurrence of this problem, the evaporator upper half 27 is disposed in the first passage 52, so that condensed water, which has been removed from the outside air, can smoothly fall by gravity down from the evaporator 26 without freezing on the tube and fins of the evaporator 26. The evaporator 26 is thus free from adhesion of frozen water and, hence, the outside air and inside air can pass through the evaporator 26 smoothly with reduced resistance. This will achieve a reduction in energy consumption of the vehicle air-conditioner 15.

The second partition wall 65 is disposed on a downstream side of the evaporator 26. More particularly, the second partition wall 65 is disposed between the evaporator 26 and the heater core 31. The second partition wall 65 is configured to separate a space between the evaporator 26 and the heater core 31 into the first passage 52 and the second passage 57. The lower half of the heater core 31 is disposed on a downstream side of the evaporator lower half 27, and the upper half of the heater core 31 is disposed on a downstream side of the evaporator upper half 28. The third partition wall 66 separate a space on a downstream side of the heater core 31 into the first passage 52 and the second passage 57.

By thus providing the first, second and third partition walls 64, 65 and 66 within the housing 21, the first passage 52 and the second passage 57 are formed within the housing 21. The evaporator lower half 27 and the lower half of the heater core 31 are disposed in the first passage 52, and the evaporator upper half 28 and the upper half of the heater core 31 are disposed in the second passage 57.

The housing 21 also includes the damper means or device 35 disposed therein. The damper device 35 includes a first switching damper 36 for switching opening and closing of the first air inlet 51, a second switching damper 37 for switching opening and closing of the second air inlet 56, a first cooling/heating switching (air-mix) damper 38 disposed downstream of the evaporator lower half 27, and a second cooling/heating switching (air-mix) damper 39 disposed downstream of the evaporator upper half 28.

The damper device 35 also includes a side vent/DEF switching damper 41 disposed downstream of the lower half of the heater core 31, a DEF/warm-air switching damper 42 disposed downstream of the upper half of the heater core 31, and a center vent/heat switching damper 43 disposed downstream of the evaporator upper half 28 and the upper half of the heater core 31.

As shown in FIG. 3, the first switching damper 36 is mounted on the housing 21 via a support shaft 36a and pivotally movable in a direction of the arrow A for opening and closing the first air inlet 51. When the first switching damper 36 is placed on a first stopper part 51a of the first air inlet 51, the outside air can be introduced or drawn from the first air inlet 51 into the first passage 52. Alternatively, when the first switching damper 36 is placed on a second stopper part 51b of the first air inlet 51, the inside air can be introduced or drawn from the first air inlet 51 into the first passage 52.

The first switching damper 36 is placed on the first stopper part 51a of the first air inlet 51 while the vehicle air-conditioner 15 is operating, for example, in a normal stable state. This means that when the vehicle air-conditioner 15 is operating in the normal stable state, the outside air is introduced or drawn from the first air inlet 51 into the first passage 52. Here, the term "normal stable state" is used to refer to, for example, a state in which the interior of the passenger compartment reaches a comfortable environment for a vehicle occupant.

The second switching damper 37 is mounted on the housing 21 via a support shaft 37e and is pivotally movable in a direction of the arrow B for opening and closing the second air inlet 56. When the second switching damper 37 is placed on a first stopper part 56a of the second air inlet 56, the inside air can be introduced or drawn from the second air inlet 56 into the second passage 57. Alternatively, when the second switching damper 37 is placed on a second stopper part 56b of the second air inlet 56, the outside air can be introduced or drawn from the second air inlet 56 into the second passage 57.

The second switching damper 37 is placed on the first stopper part 56a of the second air inlet 56 while the vehicle air-conditioner 15 is operating, for example, in the normal stable state. This means that when the vehicle air-conditioner 15 is operating in the normal stable state, the inside air is introduced or drawn from the second air inlet 56 into the second passage 57.

As shown in FIG. 4, the first cooling/heating switching damper 38 is disposed in the first passage 52 and located between the evaporator lower half 27 and the lower half of the heater core 31. The first cooling/heating switching damper 38 is mounted on the housing 21 via a support shaft 38a and pivotally movable in a direction of the arrow C. The first cooling/heating switching damper 38 is pivotally moved in the direction of the arrow C between a cool first connecting hole 71 and a heat first connecting hole 72 so that the cool first connecting hole 71 and the heat first connecting hole 72 can be opened and closed by the first cooling/heating switching damper 38.

When the heat first connecting hole 72 is closed by the first cooling/heating switching damper 38, the outside air or the inside air which has been cooled by the evaporator lower half 27 is guided via the cool first connecting hole 71 toward the DEF inlet 53 and the side vent inlet 54. The outside air or the inside air which has been cooled by the evaporator lower half 27 will be hereinafter referred to as "first cool conditioned air".

Alternatively, when the cool first connecting hole 71 is closed by the first cooling/heating switching damper 37, the outside air or the inside air which has been cooled by the evaporator lower half 27 is guided through the heat first connecting hole 72 toward the lower half of the heater core 31. The thus guided outside air or inside air is then heated by the lower half of the heater core 31. The outside air or the inside air which has been heated by the lower half of the heater core 31 will be hereinafter referred to as "first warm conditioned air".

The first cooling/heating switching damper 38 may be set in a position intermediate between the heat first connecting hole 72 and the cool first connecting hole 71 so that a part of the first cool conditioned air is guided toward the DEF inlet 53 and the side vent inlet 54 and the remaining part of the first cool conditioned air is guided toward the lower half of the heater core 31. The first warm conditioned air, which has been subjected to heating by the lower half of the heater core 31, is mixed with the part of the first cool conditioned air on a downstream side of the lower half of the heater core 31. The outside air or the inside air which is made up with a mixture of the first warm conditioned air and the first cool conditioned air will be hereinafter referred to as "first mixed conditioned air".

The second cooling/heating switching damper 39 is disposed in the second passage 57 and located between the evaporator upper half 28 and the upper half of the heater core 31. The second cooling/heating switching damper 39 is mounted on the housing 21 via a support shaft 39a and pivotally movable in a direction of the arrow D. The second cooling/heating switching damper 39 is pivotally moved in the direction of the arrow D between a cool second connecting hole 74 and a heat second connecting hole 75 so that the cool second connecting hole 74 and the heat second connecting hole 75 can be opened and closed by the second cooling/heating switching damper 39.

When the heat second connecting hole 75 is closed by the second cooling/heating switching damper 39, the outside air or the inside air which has been cooled by the evaporator upper half 28 is guided through the cool second connecting hole 74 toward the center vent inlet 58 and the front and rear heat inlet 60. The outside air or the inside air which has been cooled by the evaporator upper half 28 will be hereinafter referred to as "second cool air".

Alternatively, when the cool second connecting hole 74 is closed by the second cooling/heating switching damper 39, the outside air or the inside air which has been cooled by the evaporator upper half 28 is guided through the heat second connecting hole 75 toward the upper half of the heater core 31. The thus guided outside air or inside air is then heated by the upper half of the heater core 31. The outside air or the inside air which has been heated by the upper half of the heater core 31 will be hereinafter referred to as "second warm air".

The second cooling/heating switching damper 39 may be disposed in a position intermediate between the heat second connecting hole 75 and the cool second connecting hole 74 so that a part of the second cool air is guided toward the center vent inlet 58 and the front and rear heat inlet 60, and the remaining part of the second cool air is guided toward the upper half of the heater core 31. The second warm air which has been subjected to heating by the upper half of the heater core 31 is mixed with part of the second cool air on a downstream side of the upper half of the heater core 31. The outside air or the inside air which is made up with a mixture of the second warm air and the second cool air will be hereinafter referred to as "second mixed conditioned air".

The side vent/DEF switching damper 41 is disposed above the heater core 31 and is pivotably mounted on the housing 21 via a support shaft 41a for undergoing pivotal movement in a direction of the arrow E. The side vent/DEF switching damper 41 is pivotally moved in the direction of the arrow E between the side vent inlet 54 and a DEF connecting hole 55 so that the side vent inlet 54 and the DEF connecting hole 55 can be opened and closed by the side vent/DEF switching damper 41. The DEF connecting hole 55 is an opening or hole through which the side vent inlet 54 and the DEF inlet 53 communicate with each other.

When the side vent inlet 54 is closed by the side vent/DEF switching damper 41, the first cool conditioned air, the first warm conditioned air and the first mixed conditioned air are guided toward the DEF connecting hole. The first cool conditioned air, the first warm conditioned air and the first mixed conditioned air will be collectively referred to as "first conditioned air". Alternatively, when the DEF connecting hole 55 is closed by the side vent/DEF switching damper 41, the first conditioned air is guided toward the side vent inlet 54.

The side vent/DEF switching damper 41 may be disposed in a position intermediate between the side vent inlet 54 and the DEF connecting hole 55 so that a part of the first conditioned air is guided toward the side vent inlet 54 while the remaining part of the first conditioned air is guided toward the DEF connecting hole 55.

The DEF/warm-air switching damper 42 is disposed in the second passage 57 and located above the upper half of the heater core 31. The DEF/warm-air switching damper 42 is mounted on the housing 21 via a support shaft 42a and pivotally movable in a direction of the arrow F for opening and closing a side vent connecting hole 59.

When the side vent connecting hole 59 is closed by the DEF/warm-air switching damper 42, the outside air or the inside air, which has passed through the evaporator upper half 28 or the upper half of the heater core 31, is guided toward the center vent inlet 58 and the front and rear heat inlet 60. Alternatively, when the side vent connecting hole 59 is opened by the DEF/warm-air switching damper 42, a part of the outside air or a part of the inside air, which has passed through the evaporator upper half 28 or the upper half of the heater core 31, is guided through the side vent connecting hole 59 toward the DEF inlet 53.

The center vent/heat switching damper 43 is disposed in the second passage 57 and located rearwardly of the evaporator upper half 28 as viewed in the longitudinal direction of the vehicle body. The center vent/heat switching damper 43 is mounted on the housing 21 via a support shaft 43a and pivotally movable in a direction of the arrow G. The center vent/heat switching damper 43 is pivotally moved in the direction of the arrow G between the center vent inlet 58 and the front and rear heat inlet 60 so that the center vent inlet 58 and the front and rear heat inlet 60 can be opened and closed by the center vent/heat switching damper 43.

When the front and rear heat inlet 60 is closed by the center vent/heat switching damper 43, the outside air or the inside air, which has passed through the evaporator upper half 28 and the upper half of the heater core 31, is guided toward the center vent inlet 58. Alternatively, when the center vent inlet 58 is closed by the center vent/heat switching damper 43, the outside air or the inside air, which has passed through the evaporator upper half 28 or the upper half of the heater core 31, is guided toward the front and rear heat inlet 60.

The center vent/heat switching damper 43 may be disposed is a position intermediate between the center vent inlet 58 and the front and rear heat inlet 60 so that the outside air or the inside air, which has passed through the evaporator upper half 28 or the upper half of the heater core 31, is partially guided toward the center vent inlet 58, while the remaining part of the outside air or the remaining part of the inside air is guided toward the front and rear heat inlet 60.

Referring back to FIG. 1, the housing 21 is provided with the duct unit 18. The duct unit 18 includes a center vent duct 81 for guiding the conditioned air toward a face of an occupant sitting on each of right and left front seats, right and left side vent ducts 82 for guiding the conditioned air toward a side of the occupant sitting on each of the right and left front seats, right and left front heat vent ducts 83 (FIG. 5) for guiding the conditioned air toward feet of the occupant sitting on each of the right and left front seats, and right and left rear heat vent ducts 84 (FIG. 5) for guiding the conditioned air toward feet of an occupant sitting on a rear seat.

The duct unit 18 further has a defrost duct (DEF duct) 86 for guiding the conditioned air toward the windshield 77, and right and left side defrost ducts (side DEF ducts) 87 for guiding the conditioned air toward the right and left side windowpanes 78 (FIG. 5), respectively.

The center vent duct 81 is a duct which connects the center vent inlet 58 (FIG. 4) and the center vent outlets 91. The center vent outlets 91 are disposed substantially at a central portion 13a of the instrument panel 13. With the center vent outlets 91 thus arranged, the conditioned air blown from each of the center vent outlets 91 can be directed toward the face of the occupant sitting on a corresponding one of the right and left front seats.

The side vent ducts 82 are ducts which connect the side vent inlet 54 (FIG. 4) to the side vent outlets 92. The side vent outlets 92 are disposed at opposite right and left side portions 13b of the instrument panel 13. With this arrangement, the conditioned air blown from each of the side vent outlets 92 can be directed toward the side of the occupant sitting on a corresponding one of the right and left front seats. The conditioned air blown from the side vent outlets 92 can be also directed toward the side windowpanes 78 (FIG. 5).

As shown in FIG. 5, the right and left front heat vent ducts 83 are ducts which connect the front and rear heat inlet 60 (FIG. 4) to the right and left front heat outlets 93. The right and left front heat outlets 93 are provided at a floor panel 14 (FIG. 2) and located forwardly of the right and left front seats, respectively. With this arrangement, the conditioned air blown from each of the right and left front heat outlets 93 can be directed toward the feet of the occupant sitting on a corresponding one of the right and left front seats.

The right and left rear heat vent ducts 84 are ducts, which are provided to connect the front and rear heat inlet 60 (FIG. 4) and the right and left rear heat outlets 94. The right and left rear heat outlets 94 are provided at the floor panel 14 (FIG. 2) and located forwardly of right and left parts of the rear seat. With this arrangement, the conditioned air blown from each of the right and left rear heat outlets 94 can be directed toward the feet of the occupant sitting on the right or left side part of the rear seat.

As shown in FIG. 1, the DEF duct 86 is a duct provided to connect the DEF inlet 53 (FIG. 4) and the DEF outlet 96. The DEF outlet 96 is disposed at an upper front portion 13c of the instrument panel and located rearwardly adjacent to the windshield 77. With this arrangement, the conditioned air blown from the DEF outlet 96 can be directed toward the windshield 77.

The right and left side DEF ducts 87 are ducts which connect the DEF inlet 53 (FIG. 4) and the right and left side DEF outlets 97. The right and left side DEF outlets 97 are provided at opposite right and left side portions 13d of the instrument panel 13 and located immediately above the right and left side vent outlets 92, respectively. With this arrangement, the conditioned air blown from the right and left side DEF outlets 97 can be directed toward the right and left windowpanes 78 (FIG. 5).

As shown in FIGS. 3 and 4, the vehicle air-conditioner 15 of the present invention is configured such that outside air (air from outside the passenger compartment 11) or inside air (air from inside the passenger compartment 11) can be introduced from the first air inlet 51, and the inside air or the outside air can be introduced from the second air inlet 56.

More particularly, the vehicle air-conditioner 15 is able to first introduce thereinto the outside air or the inside air from the first air inlet 51, then generate a conditioned air as the introduced outside air or inside air passes through the evaporator lower half 27 and the lower half of the heater core 31, and finally blow the conditioned air into the passenger compartment 11. Furthermore, the vehicle air-conditioner 15 is also able to first introduce thereinto the inside air or the outside air, then generate a conditioned air as the introduced inside air or outside air passes the evaporator upper half 28 and the upper half of the heater core 31, and finally blow the conditioned air into the passenger compartment 11.

It will be appreciated that the outside air introduced from the outside of the passenger compartment 11 can be blown into the passenger compartment via the vehicle air-conditioner 15. The inside air introduced from the inside of the passenger compartment 11 can be recirculated into the passenger compartment 11 via the vehicle air-conditioner 15.

Steering wheel 101 (FIG. 1) of the vehicle 10 is provided with a humidity sensor 102. The humidity sensor 102 detects humidity inside the passenger compartment 11 and sends detected humidity information to a control unit (not shown) of the vehicle. The control unit compares the humidity information with a preset threshold value and determines, on the basis of the result of comparison, as to whether the windows are in a condition to start fogging up.

When it is determined that the windows are in a condition to start fogging up, the control unit sends a control signal to the vehicle air-conditioner 15 to thereby control the vehicle air-conditioner 15 to blow conditioned air (outside air) from the DEF duct 86 and the side DEF ducts 87. By thus providing the humidity sensor 102, it is possible to prevent the windows (windshield 77 and side windowpanes 78) from becoming fogged.

As described above, the first passage 52 is in fluid communication with the DEF outlet 96, the side DEF outlets 97 and the side vent outlets 92, and the evaporator lower half 27 and the lower half of the heater core 31 are disposed in the first passage 52. Furthermore, the first passage can selectively introduce the outside air and the inside air. Additionally, the second passage 57 is in fluid communication with the center vent outlets 91 and the front and rear heat outlets 93, 94, and the evaporator upper half 28 and the upper half of the heater core 31 are disposed in the second passage 57. Furthermore, the second passage 57 can selectively introduce the outside air and the inside air.

With this arrangement, the inside air that has been introduced into the second passage 57 can be blown from the center vent outlets 91 and the front and rear heat outlets 93, 94 into the passenger compartment 11. Thus, while the vehicle air-conditioner 15 is operating, the inside air which has been already kept at a proper temperature within the passenger compartment 11 is circulated through the air-conditioner 15 and blown from the outlets 91, 93 and 94 as conditioned air into the passenger compartment 11. By thus circulating the inside air, heating or cooling condition of the passenger compartment 11 can be adjusted efficiently.

Furthermore, the outside air that has been introduced into the first passage 51 can be blown from the DEF outlet 96, side DEF outlets 97, and side vent outlets 92 toward the windowpanes (windshield 77 and the side windowpanes 78). Thus, while the vehicle air-conditioner 15 is in operation, outside air having a low level of humidity that has been introduced from outside the passenger compartment 11 or conditioned outside air can be blown as a conditioned air from the outlets 96, 97 and 92 toward the windshield 77 and the right and left side windowpanes 78, 78. By thus blowing the conditioned air, the windshield 77 and the side windowpanes 78 can be prevented from becoming fogged.

By thus providing the first and second passages 52 and 57, the vehicle air-conditioner 15 is able to secure good temperature comfort of the passenger compartment 11 by way of circulation of the inside air through the second passage 57 while securing good anti-fogging properties of the windshield 77 and side windowpanes 78 by using the outside air introduced into the first passage 52.

Furthermore, while the vehicle air-conditioner 15 is in operation, heating or cooling conditions of the passenger compartment 11 can be efficiently adjusted, and the windshield 77 and the side windowpanes 78 (FIG. 5) can be prevented from becoming fogged. This will eliminate undue heating or cooling of the passenger compartment 11 by the conditioned air, and energy consumption by the vehicle air-conditioner 15 can be reduced.

Additionally, because the first and second fans 23 and 24 of the fan means or device 22 are separately supported on the respective drive shafts 23a and 24a, switching of the start-stop operation and adjustment of the rotational speed of these fans 23, 24 can be performed with respect to each individual fan.

Thus, during operation of the vehicle air-conditioner 15 shown in FIG. 5, the volume of conditioned air to be blown into the passenger compartment 11 can be properly adjusted in view of current heating or cooling conditions of the passenger compartment 11 or a fog-up state of the windowpanes (i.e., the windshield 77 and the side windowpanes 78). Accordingly good temperature comfort of the passenger compartment 11 and good anti-fogging property of the windowpanes 77, 78 can be secured concurrently with improved accuracy, and the energy consumption can be further reduced.

Several modes of operation of the vehicle air-conditioner 15, which are achieved in order to secure good temperature comfort of the passenger compartment 11 and good anti-fogging property of the windowpanes 77, 78, will be described below with reference to FIGS. 6 through 19. Description will be first made about several examples of operation modes achievable by the vehicle air-conditioner 15 to keep the passenger compartment 11 in an air-conditioned cool state with reference to FIGS. 6 to 13.

Figure 6A:
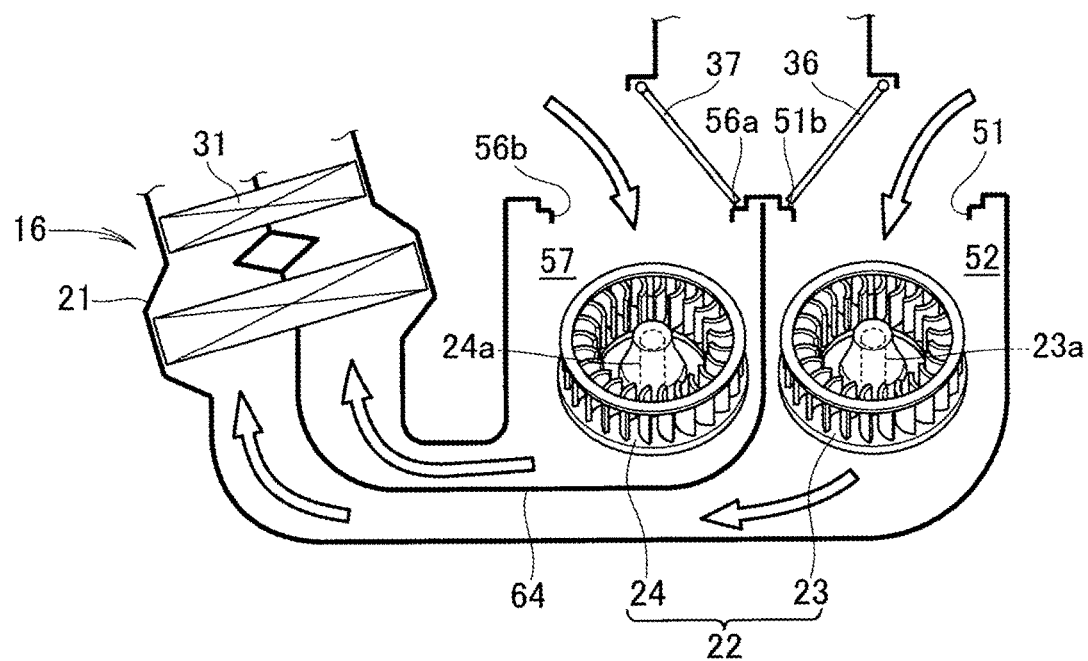
FIG. 6A is a view similar to FIG. 3, but showing a condition in which the vehicle air-conditioner is operating to achieve a maximum cooling state in a vent mode.
Figure 6B:
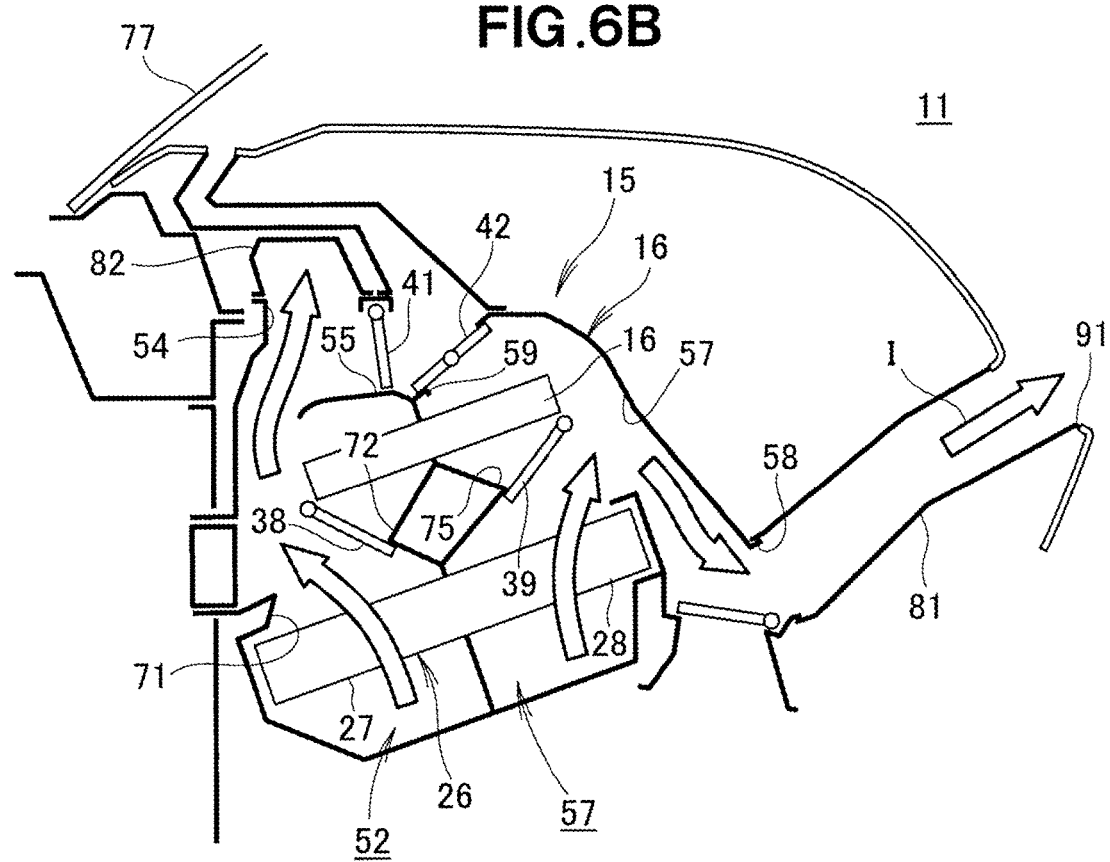
FIG. 6B is a view similar to FIG. 2, but showing a condition in which the vehicle air-conditioner is operating to achieve the maximum cooling state in the vent mode.
Figure 7:
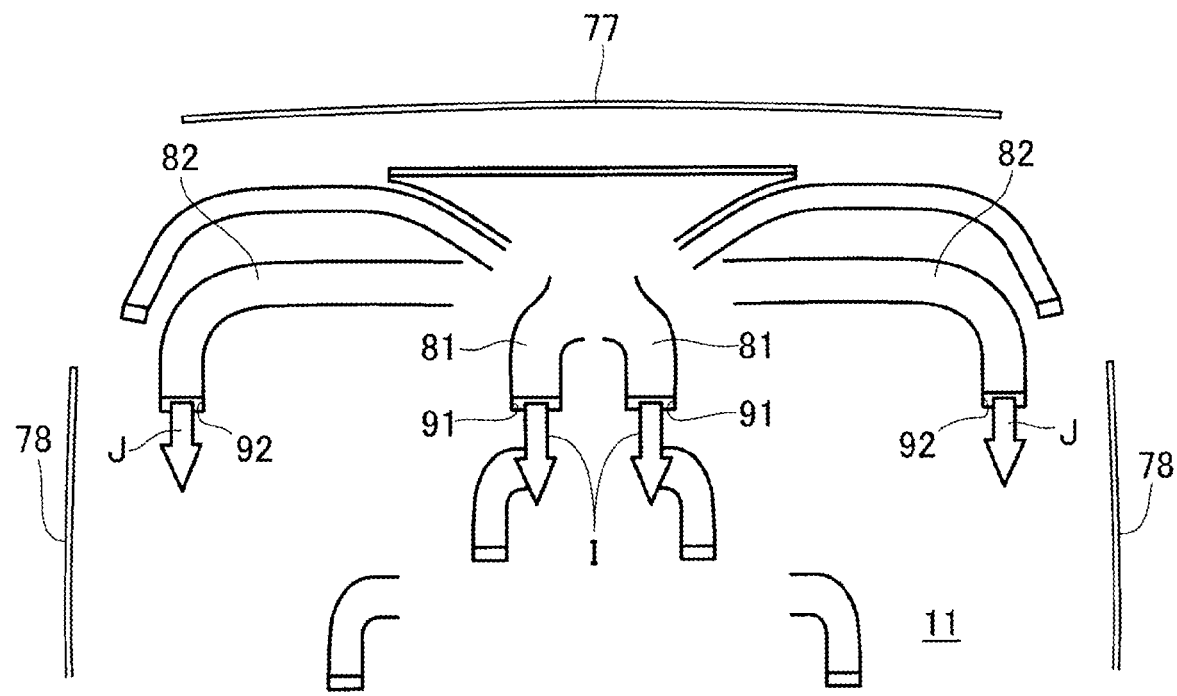
FIG. 7 is a view similar to FIG. 5, but showing a manner in which conditioned air is blown from the duct unit when the vehicle air-conditioner is operating in the maximum cooling state in the vent mode.

FIGS. 6A, 6B and 7 show the vehicle air-conditioner 15 while operating in a maximum cooling state when a vent mode is selected. As shown in FIG. 6A, the first switching damper 36 is placed on the second stopper part 51b of the first air inlet 51, and the second switching damper 37 is placed on the first stopper part 56a of the second air inlet 56. Furthermore, as shown in FIG. 6B, the first cooling/heating switching damper 38 of the air-conditioning unit 16 is placed on the heat first connecting hole 72, and the second cooling/heating switching damper 39 is placed on the heat second connecting hole 75. Additionally, the DEF/warm-air switching damper 42 is set in a position to close the side vent connecting hole 59, and the side vent/DEF switching damper 41 is placed in a position to close the DEF connecting hole 55.

As shown in FIGS. 6A and 6B, the second fan 24 is driven to rotate whereupon air inside of the passenger compartment 11 (i.e., the inside air already cooled to a proper temperature) is introduced or drawn from the second air inlet 56 into the second passage 57. The thus introduced inside air is then cooled and converted into a second cool conditioned air as it passes through the evaporator upper half 28 disposed in the second passage 57. The second cool conditioned air flows successively through the center vent inlet 58 and the center vent duct 81 and is eventually blown, as a conditioned air, from the center vent outlets 91 into the passenger compartment 11 as indicated by the arrow I (also shown in FIG. 7).

Similarly, the first fan 23 is driven to rotate whereupon the inside air, which has already been cooled to the proper temperature, is introduced or drawn from the first air inlet 51 into the first passage 52. The inside air thus introduced into the first passage 52 is then cooled and converted into a first cool conditioned air as it passes through the evaporator lower half 27 disposed in the first passage 52. The first cool conditioned air flows successively through the cool first connecting hole 71 and the side vent inlet 54 and is guided into the side vent ducts 82. As shown in FIG. 7, the first cool conditioned air guided into the side vent ducts 82 is eventually blown, as a conditioned air, from the side vent outlets 92 into the passenger compartment 11 as indicated by the arrow J.

By thus providing two independently controllable blower motor fans, namely the first and second fans 23, 24, a load per each fan can be reduced to a smaller level as compared to that of conventional air-conditioning units equipped with a single blower motor fan. This arrangement enables highly efficient, low energy-consumption operation of the vehicle air-conditioner 15.

Figure 8A:
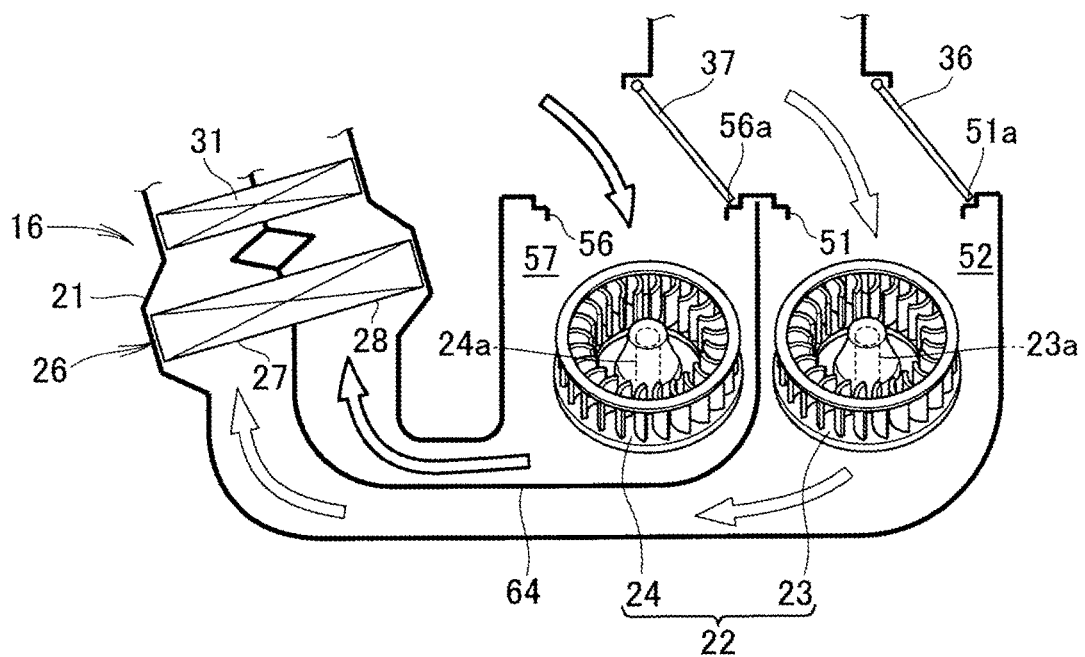
FIG. 8A is a view similar to FIG. 3, but showing a condition in which the vehicle air-conditioner is operating to achieve a normal stable state in the vent mode.
Figure 8B:
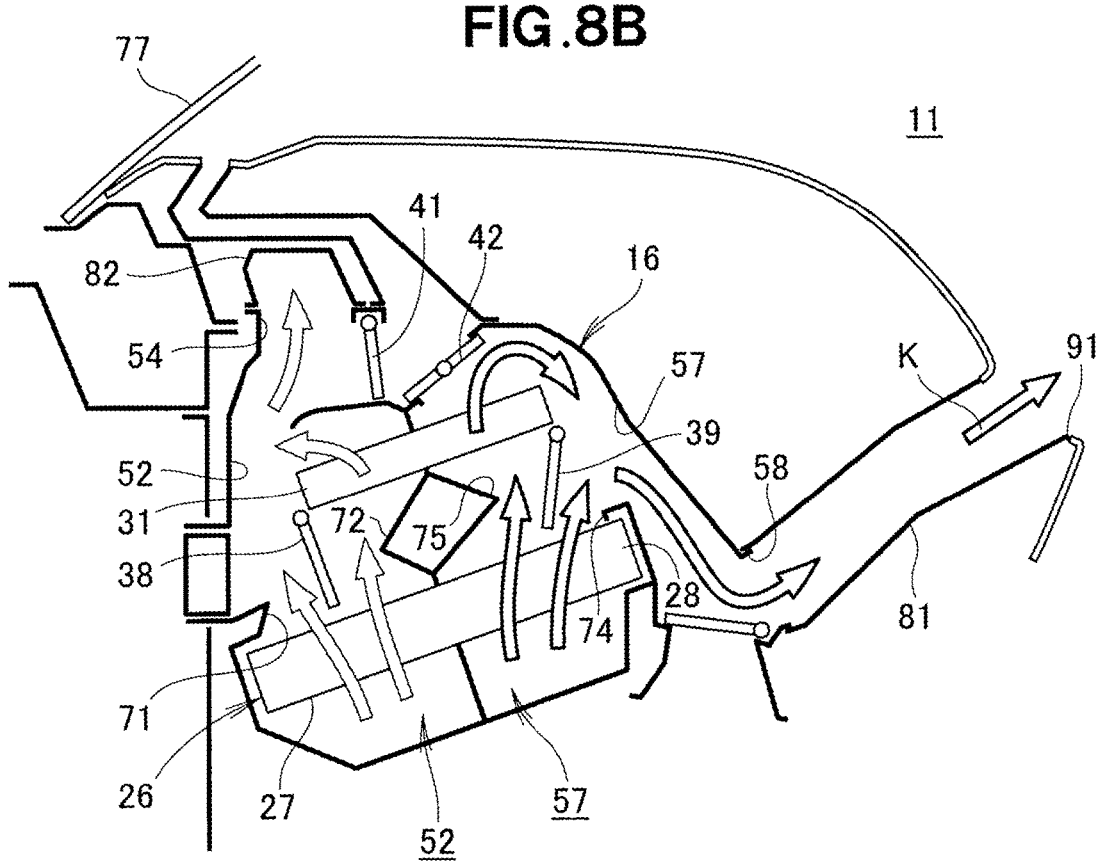
FIG. 8B is a view similar to FIG. 2, but showing a condition in which the vehicle air-conditioner is operating to achieve the normal stable state in the vent mode.
Figure 9:
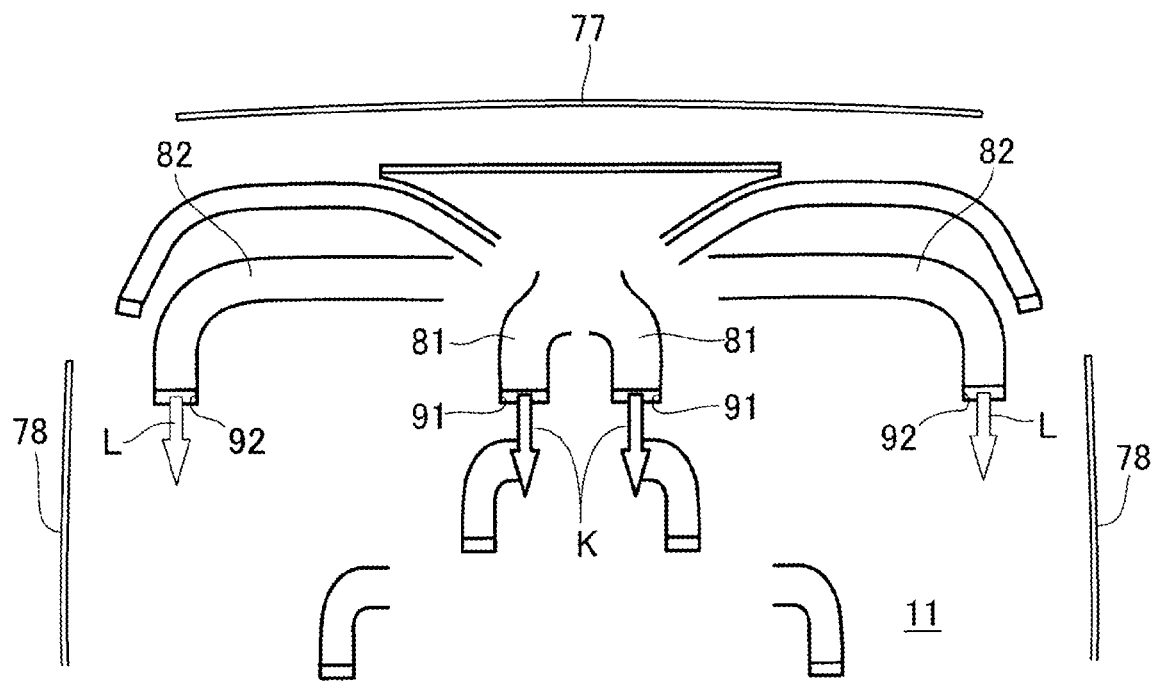
FIG. 9 is a view similar to FIG. 5, but showing a manner in which controlled air is blown from the duct unit when the vehicle air-conditioner is operating in the normal stable state in the vent mode.

FIGS. 8A, 8B and 9 show the vehicle air-conditioner 15 while operating in a normal stable state when the vent mode is selected. As shown in FIG. 8A, the first switching damper 36 is shifted from the position to achieve the maximum cooling state in the vent mode shown in FIG. 6A to a position where it is placed on the first stopper part 51a of the first air inlet 51. Furthermore, as shown in FIG. 8B, the first cooling/heating switching damper 38 of the air-conditioning unit 16 is shifted from the position as assumed in the maximum cooling state in the vent mode shown in FIG. 6B to a position intermediate between the cool first connecting hole 71 and heat first connecting hole 72. Similarly, the second cooling/heating switching damper 39 of the air-conditioning unit 16 is shifted from the position of FIG. 6B to a position intermediate between the cool second connecting hole 74 and the heat second connecting hole 75.

In this condition, the first and second fans 23 and 24 are driven to rotate at a speed lower than the speed as achieved while the vehicle air-conditioner 15 is operating in the vent mode to realize the maximum cooling state.

As shown in FIGS. 8A and 8B, air inside of the passenger compartment (that is the inside air already cooled to a proper temperature) is introduced or drawn from the second air inlet 56 into the second passage 57. The inside air drawn into the second passage 57 is cooled and converted into a second cool conditioned air as it passes across the evaporator upper half 28. A part of the second cool conditioned air flows downstream along the second passage 57 while bypassing the upper half of the heater core 31.

The remaining part of the second cool conditioned air passes across the upper half of the heater core 31 whereupon it is heated and converted into a second warm conditioned air. The second warm conditioned air flows downstream along the second passage 57 where it is mixed with the second cool conditioned air which has passed through the evaporator upper half 28 while bypassing the upper half of the heater core 31. By thus mixing the second cool conditioned air and the second warm conditioned air, a second mixed conditioned air is produced. The second mixed conditioned air has a temperature so regulated as to enable proper cooling of the passenger compartment 11. The second mixed conditioned air then flows from the center vent inlet 58 into the center vent duct 81, advances downstream along the center vent duct 81, and eventually is blown, as conditioned air, from the center vent outlets 91 into the passenger compartment 11 as indicated by the arrow K shown in FIG. 8B (also see FIG. 9).

On the other hand, as shown in FIGS. 8A and 8B, air from outside the passenger compartment 11 (that is the outside air) is introduced or drawn through the first air inlet 51 into the first passage 52. The outside air thus drawn into the first passage 52 is cooled and converted into a first cool conditioned air as it passes across the evaporator lower half 27. A part of the first cool conditioned air flows downstream along the first passage 52 while bypassing the lower half of the heater core 31.

The remaining part of the first cool conditioned air is heated and converted into a first warm conditioned air as it passes across the lower half of the heater core 31. The first warm conditioned air flows downstream along the first passage 52 where it is mixed with the first cool conditioned air which has passed through the evaporator lower half 27 while bypassing the lower half of the heater core 31. By thus mixing the first cool conditioned air and the first warm conditioned air, a first mixed conditioned air is produced. The first mixed conditioned air has a temperature so regulated as to enable proper cooling of the passenger compartment 11.

The first mixed conditioned air then flows from the side vent inlet 54 into the side vent ducts 82. As shown in FIG. 9, the first mixed conditioned air guided into the side vent ducts is blown, as a conditioned air, from the side vent outlets 92 into the passenger compartment 11, as indicated by the arrow L.

In the case of the conventional air-conditioning units, when they are operating in a normal stable state, ventilation of the passenger compartment and anti-fogging of the windowpanes should be achieved by using outside air introduced from outside the vehicle. By contrast, the vehicle air-conditioner 15 of the present invention guides the outside air (first mixed conditioned air) only into the side bent ducts 82 provided adjacent to the side windowpanes 78 while guiding the inside air (second mixed conditioned air) into the center vent duct 81. With this arrangement, the vehicle air-conditioner 15 is able to achieve a good balance between comfort and ventilation and anti-fogging property with a minimum cooling capacity. Cooling workload on the conditioned air to be blown into the passenger compartment can thus be reduced and, hence, energy consumption of the vehicle air-conditioner can be reduced, too.

Furthermore, by virtue of the use of two independently controllable blower motor fans, namely the first and second fans 23, 24, a load per each fan can be reduced to a smaller level as compared to that of conventional air-conditioning units equipped with a single blower motor fan. This arrangement insures a highly efficient operation of the vehicle air-conditioner 15 with reduced energy consumption.

Figure 10A:
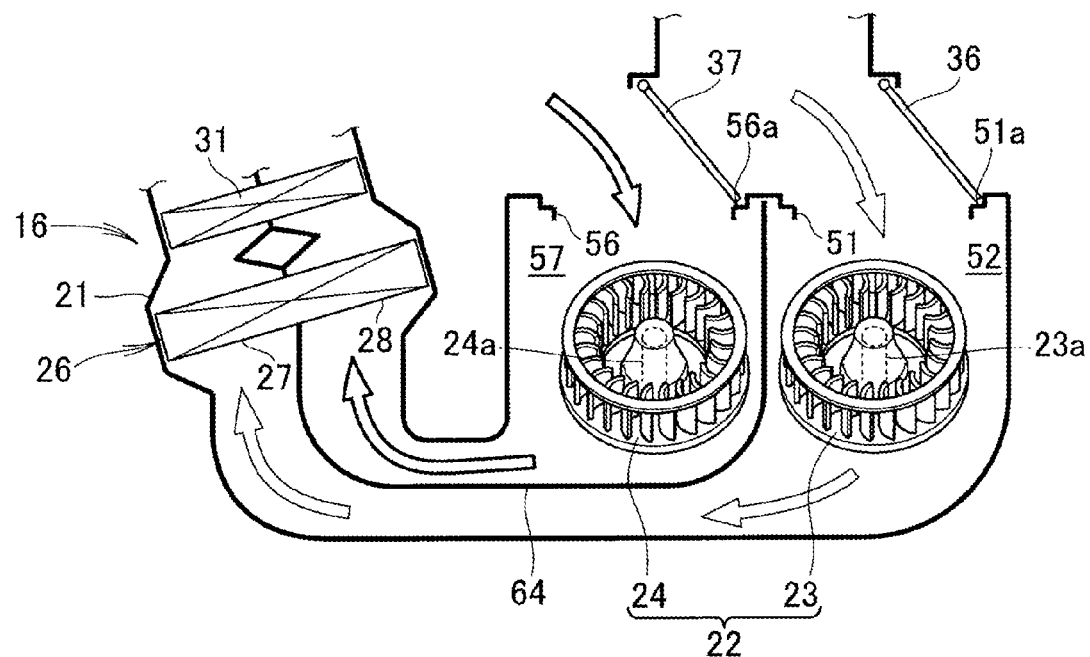
FIG. 10A is a view similar to FIG. 3, but showing a condition in which the vehicle air-conditioner is operating to achieve a normal stable state in a bi-level mode.
Figure 10B:
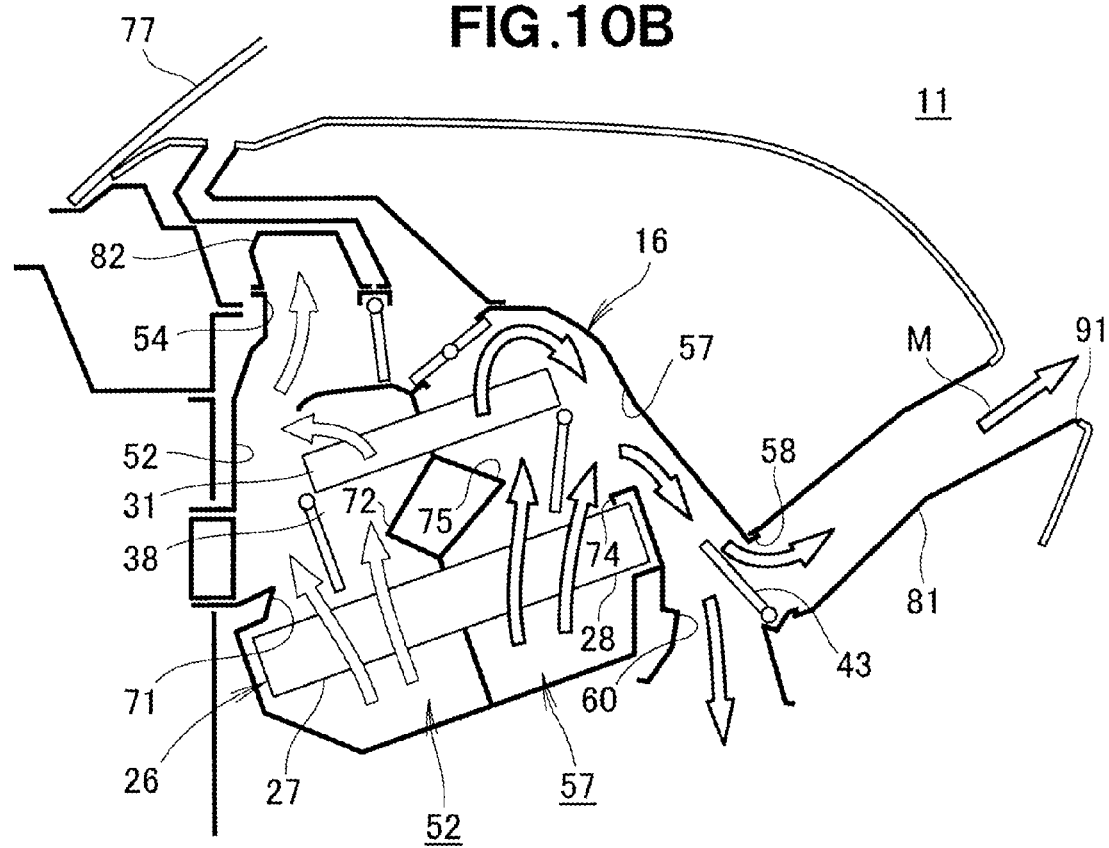
FIG. 10B is a view similar to FIG. 2, but showing a condition in which the vehicle air-conditioner is operating to achieve the normal stable state in the bi-level mode.
Figure 11:
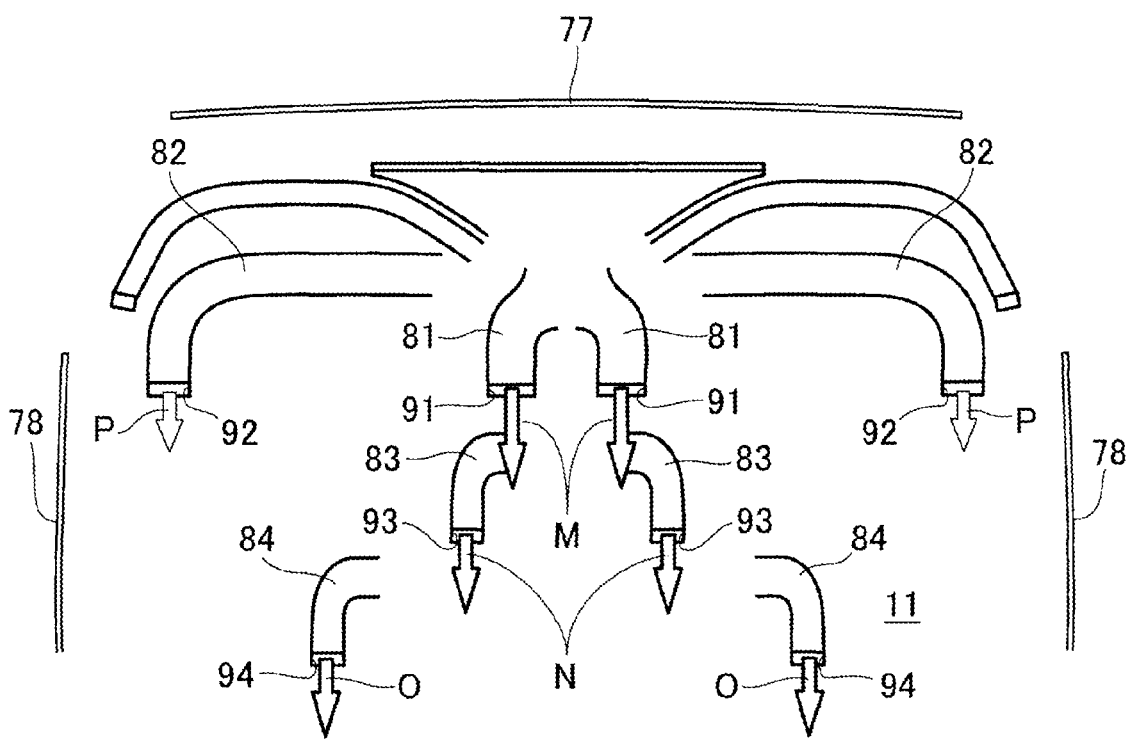
FIG. 11 is a view similar to FIG. 5, but showing a manner in which controlled air is blown from the duct unit when the vehicle air-conditioner is operating in the normal stable state in the bi-level mode.

Referring next to FIGS. 10A, 10B and 11, a description will be made about an example in which the vehicle air-conditioner 15 is operating in a normal stable state when a bi-level mode (air-conditioning mode) is selected. In this instance, the rotational speed of the first fan 23 is set to be lower than the rotational speed as achieved by the first fan 23 in the normal stable state in the vent mode shown in FIG. 8A, while the rotational speed of the second fan 24 is set to be higher than the rotational speed as achieved by the second fan 24 in the normal stable state in the vent mode. For example, the rotational speed of the first fan 23 and the rotational speed of the second fan 24 are set to be in the ratio 25:75 (=1:3).

As shown in FIG. 10B, the center vent/heat switching damper 43 is shifted from the position as assumed in the normal stable condition in the vent mode to a position intermediate between the center vent inlet 58 and the front and rear heat inlet 60.

As shown in FIGS. 10A and 10B, air inside of the passenger compartment (that is the inside air already cooled at a proper temperature) is introduced from the second air inlet 56 into the second passage 57. The inside air thus introduced into the second passage 57 is cooled and converted into a second cool conditioned air as it passes across the evaporator upper half 28. A part of the second cool conditioned air is guided into the second passage 57 while bypassing the upper half of the heater core 31.

The remaining part of the second cool conditioned air passes across the upper half of the heater core 31 whereupon it is heated and converted a second warm conditioned air. The second warm conditioned air is guided into the second passage 57 where it is mixed with the second cool conditioned air. By thus mixing the second cool conditioned air and the second warm conditioned air, a second mixed condition air is produced. The second mixed conditioned air has a temperature so regulated as to enable proper cooling of the passenger compartment 11. A part of the second mixed conditioned air flows from the center vent inlet 58 into the center vent duct 81 and is eventually blown, as a conditioned air, from the center vent outlets 91 into the passenger compartment 11, as indicated by the arrow M (also shown in FIG. 11). The remaining part of the second mixed conditioned air is guided into the heat inlet 60. As shown in FIG. 11, The second mixed conditioned air thus guided into the heat inlet 60 partially flows downstream along the front heat bent ducts 83 and is blown, as a conditioned air, from the front heat outlets 93 into the passenger compartment 11, as indicated by the arrow N. The remaining part of the second mixed conditioned air flows downstream along the rear heat vent ducts 84 and is blown, as a conditioned air, from the rear heat outlets 94 into the passenger compartment 11 as indicated by the arrow O.

On the other hand, as shown in FIGS. 10A and 10B, air from outside the passenger compartment 11 (that is the outside air) is introduced or drawn via the first air inlet 51 into the first passage 52. The outside air thus introduced in the first passage 52 is cooled and converted into a first cool conditioned air as it pass passed across the evaporator lower half 27. A part of the first cool conditioned air is guided into the first passage 52 while bypassing the lower half of the heater core 31.

The remaining part of the first cool conditioned air passes across the lower half of the heater core 31 whereupon it is heated and converted into a first warm conditioned air. The first warm conditioned air is guided into the first passage 52 where it is mixed with the first cool conditioned air. By thus mixing the first warm conditioned air and the first cool conditioned air, a first mixed conditioned air is produced. The first mixed conditioned air has a temperature so regulated as to enable proper cooling of the passenger compartment 11.

The first mixed conditioned air is guided from the side vent inlet 54 into the side bent ducts 82. As shown in FIG. 11, the first mixed conditioned air thus guided in the side vent ducts 82 is blown, as a conditioned air, from the side vent outlets 92 into the passenger compartment 11, as indicated by the arrow P. The conditioned air blown from the side vent outlets 92 as indicated by the arrow P partially impinges on respective inside surfaces of the side window-panes 78. This will facilitate highly efficient securement of a fog-free state of the side windowpanes 78.

Since the outside air (first mixed conditioned air) is guided only into the side bent ducts 82 provided adjacent to the side windowpanes 78 while the inside air (second mixed conditioned air) is guided into the center vent duct 81 and the front and rear heat vent ducts 83, 84, a good balance between comfort and ventilation and anti-fogging property can be achieved with a minimum cooling capacity. Cooling workload on the conditioned air to be blown into the passenger compartment 11 can thus be reduced and, hence, energy consumption of the vehicle air-conditioner 15 can be reduced, too.

Furthermore, because of the use of two independently controllable blower motor fans (i.e., the first fan 23 and second fan 24), air volumes (corresponding to rotational speeds) of these fans 23, 24 can be regulated independently from one another. With this arrangement, a ventilating operation and an anti-fogging operation can be achieved with a minimum amount of outside air introduced in the vehicle air-conditioner 15. This will achieve a further reduction in energy consumption.

While the vehicle air-conditioner 15 is operating in the normal stable state in the bi-level mode shown in FIGS. 10A, 10B and 11, it may occur that the humidity of the passenger compartment 11 exceeds a prescribed value (threshold value) and the control unit determines that windowpanes are in a condition to start fogging up. When such condition occurs, the vehicle air-conditioner operates in such a manner as discussed below with reference to FIGS. 12A, 12B and 13.

Figure 12A:
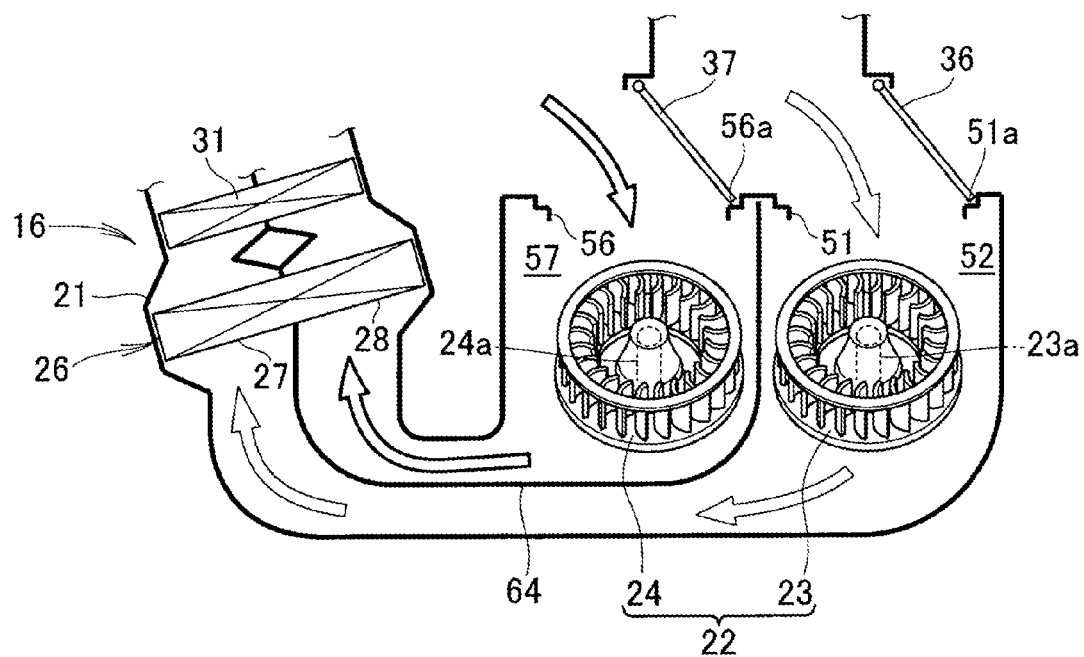
FIG. 12A is a view similar to FIG. 3, but showing a condition in which the vehicle air-conditioner is operating to achieve an anti-fogging state in the bi-level mode.
Figure 12B:
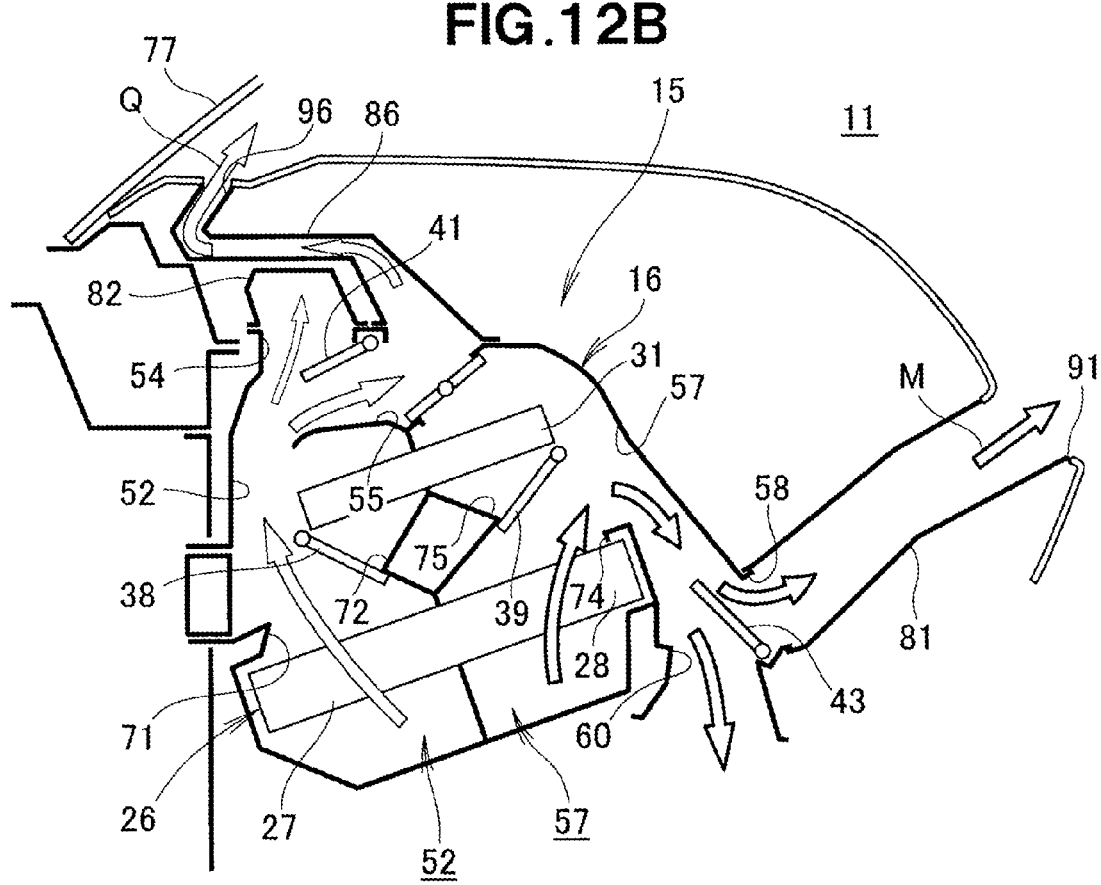
FIG. 12B is a view similar to FIG. 2, but showing a condition in which the vehicle air-conditioner is operating to achieve the anti-fogging state in the bi-level mode.

As shown in FIGS. 12A and 12B, when the humidity of the passenger compartment 11 exceeds a prescribed value (threshold value), the control unit determines, on the basis of humidity information detected by the humidity sensor 102 (FIG. 1), that the windowpanes are in a condition to start fogging up. The control units issue a control signal on the basis of which the air-conditioning unit 16 of the vehicle air-conditioner 15 is set in an anti-fogging state in the bi-level mode.

The vehicle air-conditioner 15 changes the condition shown in FIG. 10B such that the first cooling/heating switching damper 38 is set in a position to close the heat first connecting hole 72, and the second cooling/heating switching damper 39 is set in a position to close the heat second connecting hole 75. Furthermore, the side vent/DEF switching damper 41 is set in a position intermediate between the side vent inlet 54 and the DEF connecting hole 55. In this condition, the rotational speed of the first fan 23 shown in FIG. 12A is increased to thereby increase the volume of blow-out air. For example, the rotational speed of the first fan 23 and the rotational speed of the second fan 24 are set in the ratio 65:35.

Air inside of the passenger compartment 11 (that is the inside air already cooled to a proper temperature) is introduced or drawn from the second air inlet 56 into the second passage 57. The inside air thus guided in the second passage 57 is cooled and converted into a second cool conditioned air as it passes across the evaporator upper half 28. The second cool conditioned air partially flows from the center vent inlet 58 into the center vent duct 81 and is eventually blown, as a conditioned air, from the center vent outlets 91 into the passenger compartment 11, as indicated by the arrow M.

Figure 13:
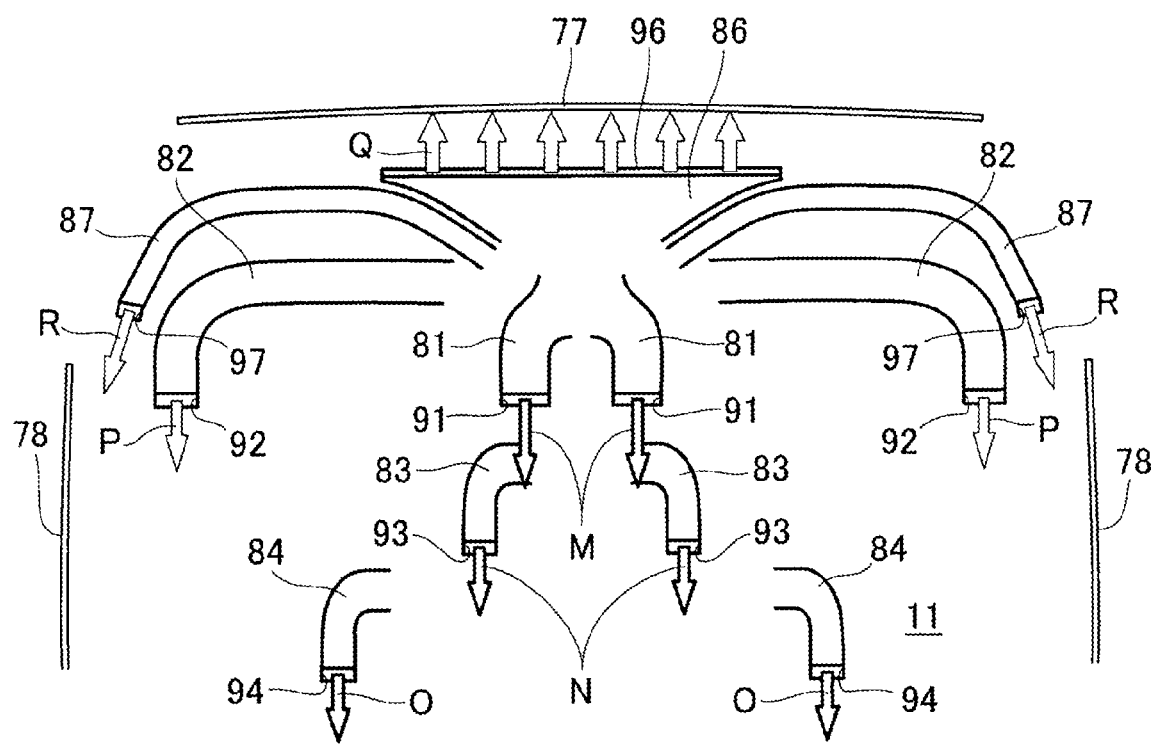
FIG. 13 is a view similar to FIG. 5, but showing a manner in which controlled air is blown from the duct unit when the vehicle air-conditioner is operating in the anti-fogging state in the bi-level mode.

The remaining part of the second cool conditioned air is guided into the front and rear heat inlet 60. As shown in FIG. 13, the second cool conditioned air thus guided in the front and rear heat inlet 60 (FIG. 12B) partially flows downstream along the front heat vent ducts 83 and is eventually blown, as a conditioned air, from the front heat outlets 93 into the passenger compartment 11, as indicated by the arrow N. The remaining part of the second cool conditioned air flows downstream along the rear heat vent ducts 84 is eventually blown, as s conditioned air, from the rear heat outlets 94 into the passenger compartment 11, as indicated by the arrow O.

Since the inside air already cooled to a proper temperature is cooled before being blown as a conditioned air from the center vent outlets 91 and the front and rear heat outlets 93, 94, the air-conditioned state of the passenger compartment 11 can be adjusted with increased efficiency.

As shown in FIGS. 12A and 12B, air outside of the passenger compartment 11 (that is the outside air) is introduced or drawn from the first air inlet 51 into the first passage 52. The outside air thus introduced in the first passage 52 is cooled and converted into a first cool conditioned air as it passes across the evaporator lower half 27. The first cool conditioned air has a low level of humidity. The first cool conditioned air is guided successively through the cool first connecting hole 71 and the side vent inlet 53 into the side vent ducts 82 while by passing the lower half of the heater core 31. The first cool conditioned air thus guided in the side vent ducts 82 is blown, as a conditioned air, from the side vent outlets 92 into the passenger compartment 11, as indicated by the arrow P.

The remaining part of the first cool conditioned air passes through the DEF connecting hole 55 and is distributed in a branched fashion into the DEF duct 86 and a pair of side DEF ducts 87 (FIG. 13). The first cool conditioned air guided into the DEF duct 86 is blown, as a conditioned air, from the DEF outlet 96 toward the inside surface of the windshield 77, as indicated by the arrow Q. By thus blowing the conditioned air onto the inside surface of the windshield 77, a fog-free state of the windshield 77 can be maintained reliably and efficiently.

The first cool conditioned air guided into the side DEF ducts 87 is blown, as a conditioned air, from the side DEF outlets 92 toward the side windowpanes 78, as indicated by the arrow R shown in FIG. 13. Furthermore, the conditioned air blown from the side vent outlets 92 as indicated by the arrow P partially impinges on the side windowpanes 78. By virtue of a combination of the conditioned air blown from the side DEF outlets 97 and a part of the conditioned air blown from the side vent outlets 92, a fog-free state of the of the side windowpanes 78 can be maintained reliably and efficiently.

During an anti-fogging operation in the bi-level mode shown in FIGS. 12A, 12B and 13, the volume of blow-out air is increased, in order to keep the windshield 44 and the side windowpanes 78 in a fog-free state. To this end, the rotational speed ratio between the first fan 23 and the second fan 24 is set to be 65:35 (=13:7). According to one preferred embodiment, a total air volume of the conditioned air is set to be 380 m³/h.

Under such conditions, a volume of the second cool conditioned air blown from the center vent outlets 91, front heat outlets 93 and rear heat outlets 94 and a volume of the first cool conditioned air blown from the side vent outlets 92, DEF outlet 96 and side DEF outlets 97 are set to be the ratio 35:65 (=7:13) and, accordingly, the volume of inside air is 133 m³/h and the volume of outside air is 247 m³/h.

As thus far described, air inside of the passenger compartment (the inside air already cooled to a proper temperature) is cooled to generate a conditioned air and the conditioned air is blown from the center vent outlets 91 and the front and rear heat outlets 93, 94. By thus blowing the conditioned air, the air-conditioned state of the passenger compartment can be adjusted easily and efficiently. Furthermore, by merely increasing the rotational speed of the first fan 23 in the bi-level mode of operation, a fog-free state of the windshield 77 and the side windowpanes 78 can be maintained reliably and efficiently.

By virtue of a combination of the outside air (first cool conditioned air), which is guided into the side vent ducts 82 located adjacent to the side windowpanes 78, the side DEF ducts 87, and the DEF duct 86 located adjacent to the windshield 77, and the inside air (second cool conditioned air) which is guided into the center vent ducts 81 and the front and rear heat vent ducts 83, 84, a good balance between comfort and ventilating and anti-fogging operation can be achieved with a minimum cooling capacity. The cooling workload on a conditioned air to be blown into the passenger compartment 11 can thus be reduced and, hence, the energy consumption of the vehicle air-condition can be reduced, too.

Furthermore, because of the use of two independently controllable blower motor fans (i.e., the first and second fans 23, 24), the flow volumes (corresponding to the rotational speeds) of these fans 23, 24 can be adjusted for each individual fan. With this arrangement, a ventilating operation and an anti-fogging operation can be achieved with a minimum amount of outside air introduced in the vehicle air-conditioner 15. Stated in other words, the volume of conditioned air can be properly adjusted in accordance with a desired anti-fogging operation in the bi-level mode. This will ensure that during a bi-level mode operation, a fog-free state of the windowpanes can be maintained reliably and efficiently, and a further reduction in energy consumption of the vehicle air-conditioner 15 can be achieved.

Description will be next made about several examples of operation modes achievable by the vehicle air-conditioner 15 to keep the passenger compartment 11 in an air-conditioned warm state with reference to FIGS. 14 to 19.

Figure 14A:
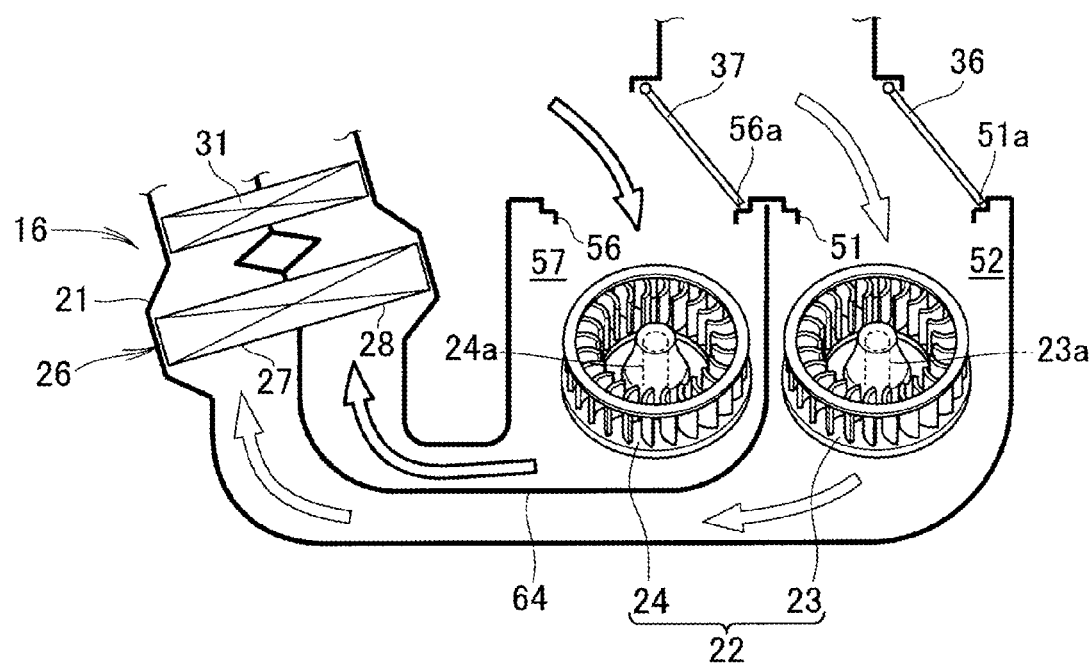
FIG. 14A is a view similar to FIG. 3, but showing a condition in which the vehicle air-conditioner is operating to achieve a normal stable state in a heat mode.
Figure 14B:
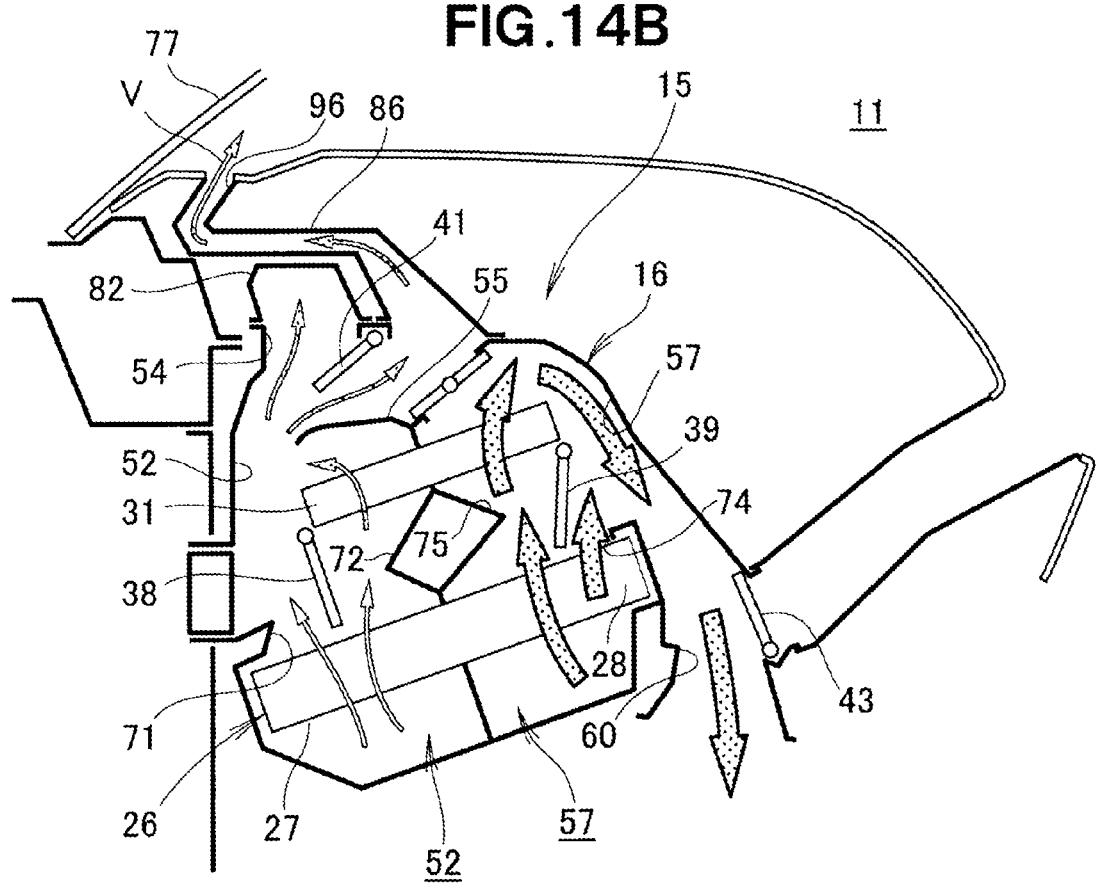
FIG. 14B is a view similar to FIG. 2, but showing a condition in which the vehicle air-conditioner is operating to achieve the normal stable state in the heat mode.
Figure 15:
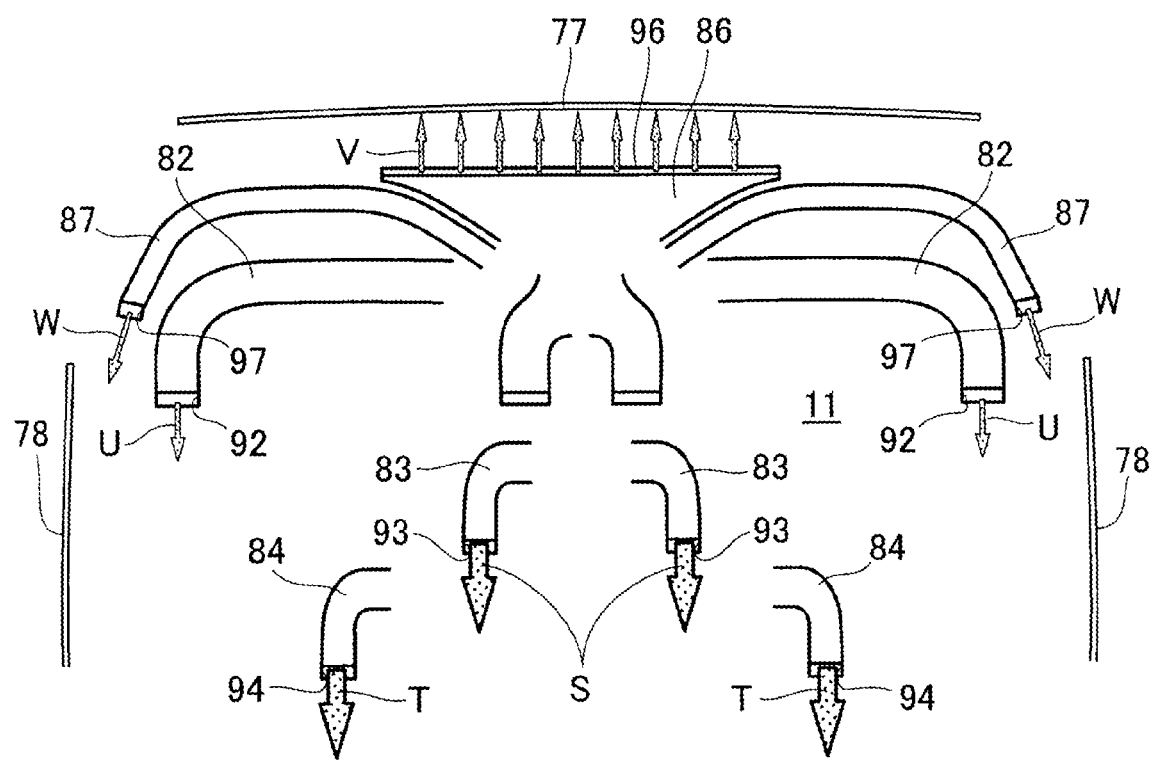
FIG. 15 is a view similar to FIG. 5, but showing a manner in which controlled air is blown from the duct unit when the vehicle air-conditioner is operating in the normal stable state in the heat mode.

Referring now to FIGS. 14A, 14B and 15, there is shown the vehicle air-conditioner 15 while operating in a normal stable state in a heat mode (air-conditioning mode). As shown in FIG. 14A, the first switching damper 36 is placed on the first stopper part 51a of the first air inlet 51, and the second switching damper 37 is placed on a first stopper part 56a of the second air inlet 56. Furthermore, as shown in FIG. 14(b), the first cooling/heating switching damper 38 is set in a position intermediate between the cool first connecting hole 71 and the heat first connecting hole 72, and the second cooling/heating switching damper 39 is set in a position intermediate between the cool second connecting hole 74 and the heat second connecting hole 75. The side vent/DEF switching damper 41 is set in a position intermediate between the side vent inlet 54 and the DEF connecting hole 55.

Under such conditions, the first and second fans 23 and 24 are driven to start rotation. In this instance, the rotational speed ratio between the first fan 23 and the second fan 24 is set to be 25:75 (=1:3).

As shown in FIGS. 14A and 14B, air inside of the passenger compartment 11 (the inside air already heated to a proper temperature) is introduced from the second air inlet 26 into the second passage 57. The inside air thus introduced in the second passage 57 is cooled and converted into a second cool conditioned air as it passes across the evaporator upper half 28. A part of the second cool conditioned air is guided into the second passage 57 while bypassing the upper half of the heater core 31.

The remaining part of the second cool conditioned air passes across the upper half of the heater core 31 whereupon it is heated and converted into a second warm conditioned air. The second warm conditioned air is guided into the second passage 57 where it is mixed with the second cool conditioned air and a second mixed conditioned air is generated. The second mixed conditioned air has a temperature, which is adjusted to enable proper heating of the passenger compartment. The second mixed conditioned air is guided into the front and rear heat inlet 60. As shown in FIG. 15, a part of the second mixed conditioned air thus guided in the front and rear heat inlet 60 flows downstream along the front heat vent ducts 63 and is eventually blown, as a conditioned air, from the front heat outlets 93 into the passenger compartment 11, as indicated by the arrow S. The remaining part of the second mixed conditioned air flows downstream along the rear heat vent ducts 83 and is eventually blown, as a conditioned air, into the passenger compartment 11, as indicated by the arrow T.

Since the inside air which has already been heated to a proper temperature is used and reheated to generate a conditioned air to be blown from the front and rear heat outlets 93, 94, a passenger-compartment heating operation can be performed efficiently.

Furthermore, as shown in FIGS. 14A and 14B, air outside of the passenger compartment 11 (outside air) is introduced from the first air inlet 51 into the first passage 52. The outside air thus introduced in the first passage 52 is cooled and converted into a first cool conditioned air as it passes across the evaporator lower half 27. The first cool conditioned air has a low level of humidity. A part of the first cool conditioned air is guided in the first passage 52 while bypassing the lower half of the heater core 31.

The remaining part of the first cool conditioned air passes across the lower half of the heater core 31 whereupon it is heated and converted into a first warm conditioned air. The first warm conditioned air is guided into the first passage 52 where it is mixed with the first cool conditioned air. With this mixing, a first mixed condition air is generated. The first mixed conditioned air has a temperature, which is adjusted to enable proper heating of the passenger compartment. A part of the first mixed conditioned air is guided from the side vent inlet 54 into the side vent ducts 82.

As shown in FIG. 15, the first mixed conditioned air thus guided in the side vent ducts 82 is blown, as s conditioned air, from the side vent outlets 92 into the passenger compartment 11, as indicated by the arrow U. A part of the conditioned air which is blown from the side vent outlets 92 impinges on the inside surfaces of the side windowpanes 78.

As shown in FIGS. 14A and 14B, the remaining portion of the first mixed conditioned air passes through the DEF connecting hole 55 and is distributed in a branched fashion into the DEF duct 86 and the side DEF ducts 87 (FIG. 15). As shown in FIG. 15, the first mixed conditioned air thus guided in the DEF duct 86 is blown, as a conditioned air, from the DEF outlet 96 toward the inside surface of the windshield 77, as indicated by the arrow V. By thus blowing the conditioned air (outside air conditioned to have a low level of humidity) from the DEF outlet 96, a fog-free state of the windshield 77 can be maintained reliably and efficiently.

Furthermore, the first mixed conditioned air guided in the side DEF ducts 87 is blown, as a conditioned air, from the side DEF outlets 97 toward the inside surfaces of the side windowpanes 78. By thus blowing the conditioned air (outside air conditioned to have a low level of humidity) from the side DEF outlets 97, in combination with that part of the conditioned air (outside air conditioned to have a low level of humidity) blown from the side vent outlets 92 and impinging on the inside surfaces of the side windowpanes 78, a fog-free state of the side windowpanes 78 can be maintained reliably and efficiently.

As previously described, the rotational speed ration between the first fan 23 and the second fan 24 is set to be 25:75 (=1:3). Furthermore, a total volume of conditioned air is set to be 320 m³/h, for example.

Under such conditions, a volume of the second mixed conditioned air (inside air) blown from the front heat outlets 93 and rear heat outlet 94 and a volume of the first mixed conditioned air (outside air) blown from the side bent outlets, DEF outlet 96 and side DEF outlets 97 are set to be the ratio 75:25 (=3:1) and, accordingly, the volume of inside air is 240 m³/h and the volume of outside air is 80 m³/h.

By virtue of a combined effect of the outside air (first mixed conditioned air), which is guided into the side vent ducts 82 located adjacent to the side windowpanes 78, the side DEF ducts 87, and the DEF duct 86 located adjacent to the windshield 77, and the inside air (second mixed conditioned air) which is guided into the front and rear heat vent ducts 83, 84, a good balance between comfort and ventilating and anti-fogging operation can be achieved with a minimum cooling capacity. The cooling workload on a conditioned air to be blown into the passenger compartment 11 can thus be reduced and, hence, the energy consumption of the vehicle air-condition can be reduced, too.

Furthermore, because of the use of two independently controllable blower motor fans (i.e., the first and second fans 23, 24), the flow volumes (corresponding to the rotational speeds) of these fans 23, 24 can be adjusted for each individual fan. With this arrangement, a ventilating operation and an anti-fogging operation can be achieved with a minimum amount of outside air introduced in the vehicle air-conditioner 15 and, hence, the energy consumption of the vehicle air-conditioner can be reduced, too.

During operation in a normal stable state in the heat mode shown in FIGS. 14A, 14B and 15, it may occur that the humidity of the passenger compartment 11 increases to a level higher than a prescribed value (threshold value) and the control unit determines that the windowpanes are in a condition to start fogging up. When such condition occurs, the vehicle air-conditioner 15 will shift its operation from the heat mode (normal stable state) shown in FIGS. 14A, 14B and 15 to, for example, an anti-fogging state, as will be discussed below with reference to FIGS. 16A, 16B and 17.

Figure 16A:
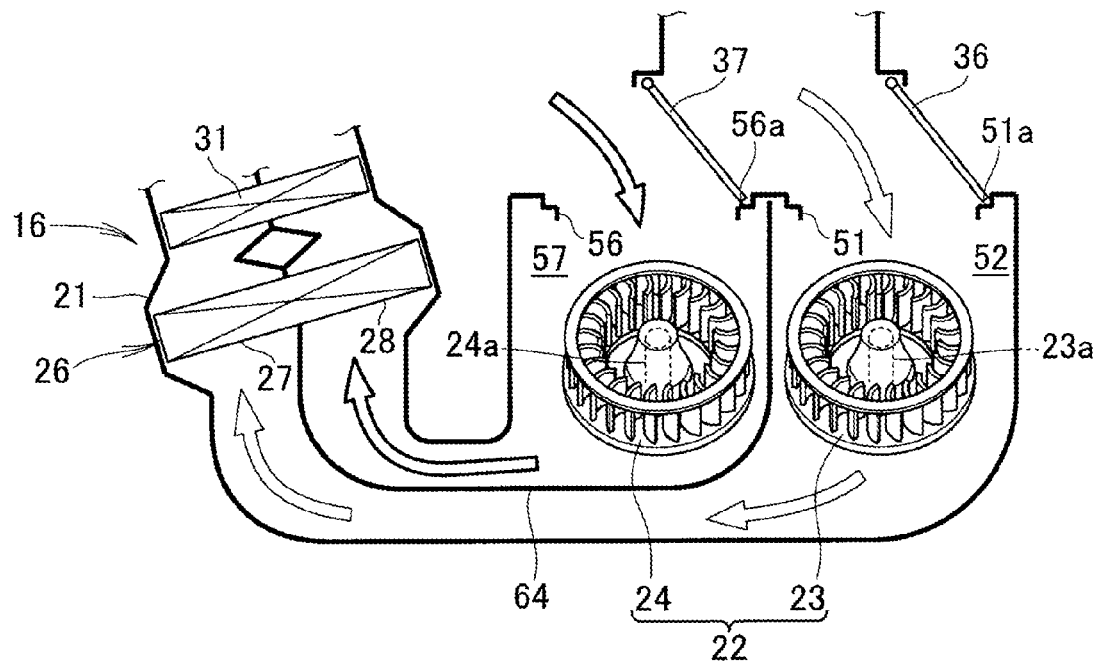
FIG. 16A is a view similar to FIG. 3, but showing a condition in which the vehicle air-conditioner is operating to achieve a maximum-heating and anti-fogging state in the heat mode.
Figure 16B:
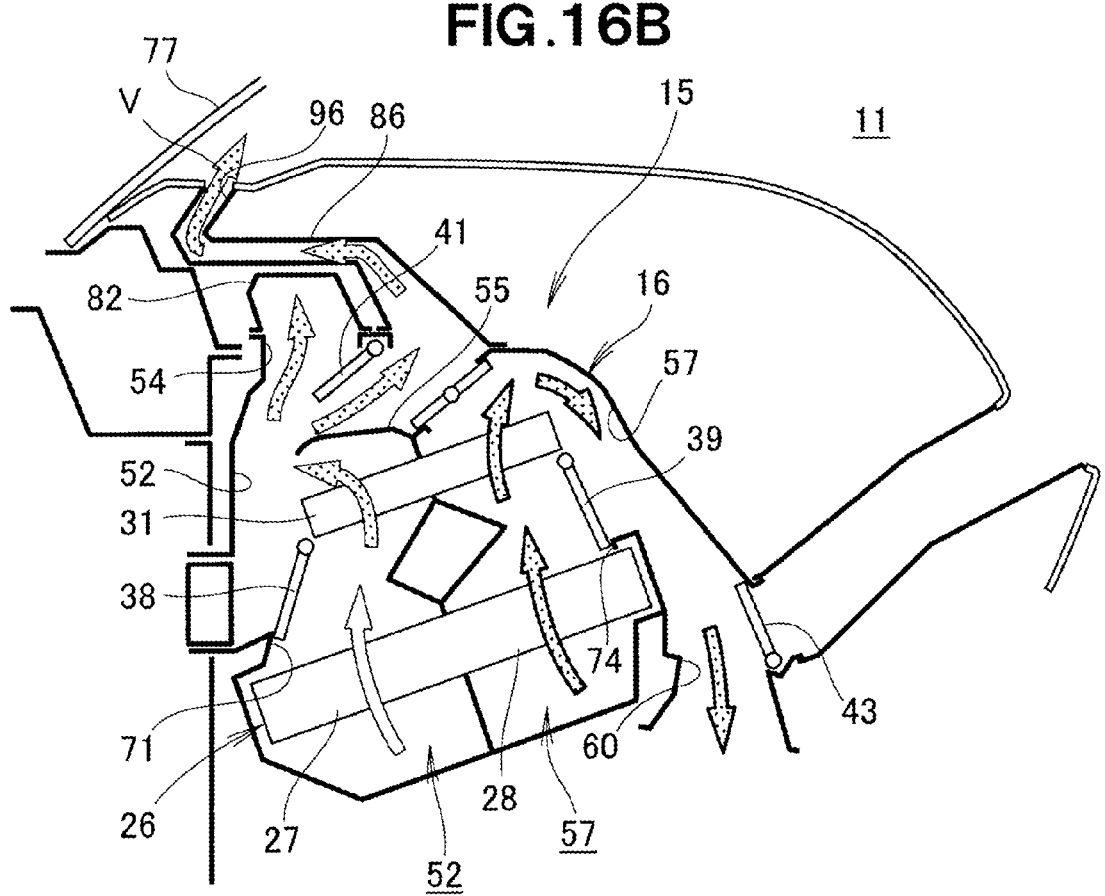
FIG. 16B is a view similar to FIG. 2, but showing a condition in which the vehicle air-conditioner is operating to achieve the maximum-heating and anti-fogging state in the heat mode.

As shown in FIGS. 16A and 16B, when the humidity of the passenger compartment 11 exceeds a prescribed value (threshold value), the control units determines, on the basis of humidity information detected by the humidity sensor 102 (FIG. 1), that the windowpanes are in a condition to start fogging up. The control units issues a control signal on the basis of which the air-conditioning unit 16 of the vehicle air-conditioner 15 is set in a condition to realize a fog-free state and a maximum heat state concurrently in the heat mode, which is called "maximum heat/defrost mode".

As shown in FIG. 16B, the first cooling/heating switching damper 38 set in a position to close the cool first connecting hole 71, and the second cooling/heating switching damper 39 is set in a position to close the cool second connecting hole 74. Furthermore, rotational speed of the first fan 23 is increased to thereby increase the volume of air sent out from the first fan 23. For instance, the rotational speed ratio between the first fan 23 and the second fan 24 is set to be 50:50 (=1:1).

As shown in FIGS. 16A and 16B, air inside of the passenger compartment 11 (inside air already heated to a proper temperature) is introduced from the second air inlet 56 into the second passage 57. The inside air thus introduced in the second passage 57 passes successively through the evaporator upper half 28 and the upper half of the heater core 31. As it passes across the upper half of the heater core 31 the inside air is heated and converted in a second warm conditioned air. The second warm conditioned air is guided into the front and rear heat inlet 60.

Figure 17:
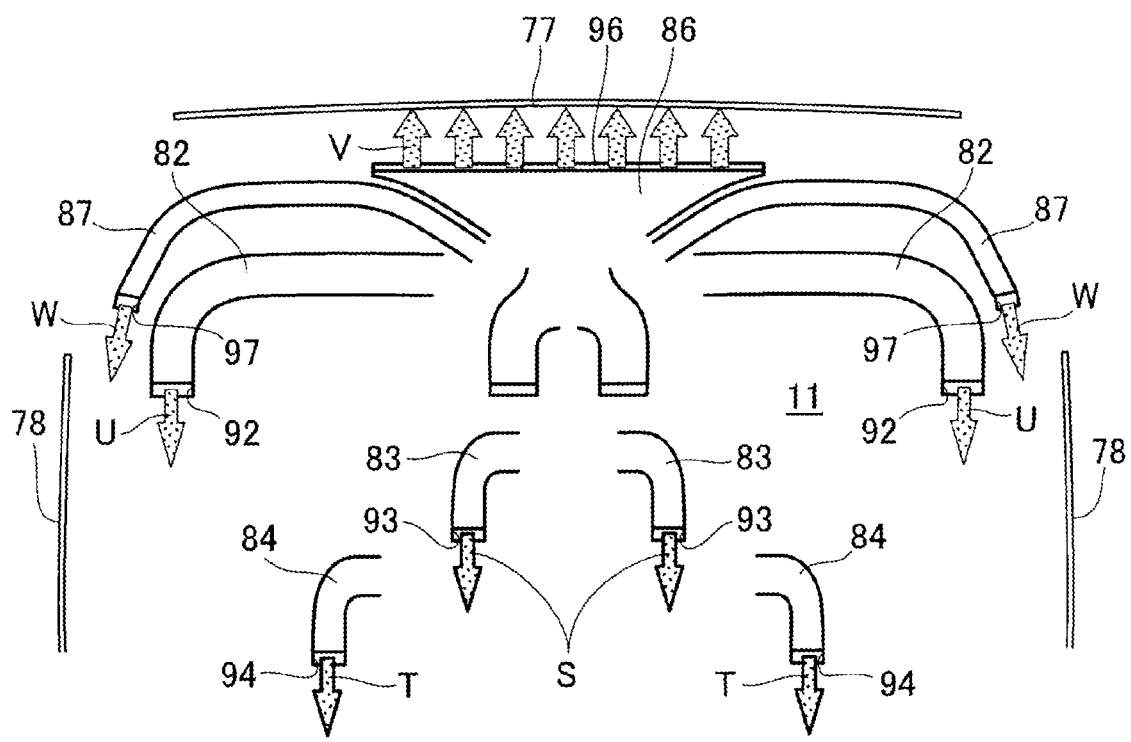
FIG. 17 is a view similar to FIG. 5, but showing a manner in which controlled air is blown from the duct unit when the vehicle air-conditioner is operating in the maximum-heating and anti-fogging state in the heat mode.

As shown in FIG. 17, a part of the second warm conditioned air thus guided in the front and rear heat inlet 60 flows downstream along the front heat vent ducts 83 and is eventually blown, as a conditioned air, from the front heat outlets 93 into the passenger compartment 11, as indicated by the arrow S. The remaining part of the second warm conditioned air flows downstream along the rear heat vent ducts 84 and is eventually blown, as a conditioned air, into the passenger compartment 11, as indicated by the arrow T. Since the inside air already heated to a proper temperature is used and reheated to generate a conditioned air and the conditioned air is blown from the front and rear heat outlets 93, 94, the air-conditioned state (heated state) of the passenger compartment 11 can be adjusted easily and efficiently.

Furthermore, because the rotational speed of the first fan 23 is increased to thereby increase the volume of air blown by the first fan 23, a relatively large amount of outside air is guided toward the evaporator lower half 27. The outside air is conditioned to have a low level of humidity as it passes across the evaporator lower half 27. The thus conditioned outside air passes across the lower half of the heater core 31 whereupon it is heated and converted in a first warm conditioned air having a low level of humidity. A part of the first warm conditioned air is guided from the side vent inlet 54 into the side vent ducts 82.

As shown in FIG. 7, the first warm conditioned air thus guided in the side vent ducts 82 is blown in large amounts, as a conditioned air, from the side vent outlets 92 into the passenger compartment 11, as indicated by the arrow U. A part of the conditioned air blown from the side vent outlets 92 impinges on the inside surfaces of the side windowpanes 78.

Furthermore, as shown in FIGS. 16A and 16B, the remaining part of the first warm conditioned air, which has been heated by the lower half of the heater core 31, passes through the DEF connecting hole 55 and is distributed in a branched fashion into the DEF duct 86 and the side DEF ducts 87 (FIG. 17). As shown in FIG. 17, the first warm conditioned air (outside air conditioned to have a low level of humidity) distributed in the DEF duct 86 is blown, as a conditioned air, from the DEF outlets 96 toward the inside surface of the windshield 77, as indicated by the arrow V. By virtue of the conditioned air (outside air conditioned to have a low level of humidity) blown from the DEF outlet 96, a fog-free state of the windshield 77 can be maintained reliably and efficiently.

Additionally, the first warm conditioned air distributed in the side DEF ducts 87 is blown, as a conditioned air, from the side DEF outlets 97 toward the inside surfaces of the side windowpanes 78, as indicated by the arrow W. By virtue of a combined effect of the conditioned air (outside air conditioned to have a low level of humidity) blown from the side DEF outlets 97 and a part of the conditioned air (outside air conditioned to have a low level of humidity) blown from the side vent outlets 92 and impinging on the inside surfaces of the side windowpanes 78, a fog-free state of the side windowpanes 78 can be maintained reliably and efficiently.

As previously described, the rotational speed ratio between the first fan 23 and the second fan 24 is set to be 50:50 (=1:1). Furthermore, a total volume of conditioned air is set to be 350 m$^3$/h.

Under such conditions, the volumetric ratio between the second warm conditioned air (inside air) blown from the front heat outlets 93 and rear heat outlets 94 and the first warm condition air (outside air) blown from the side vent outlets 92, DEF outlet 96 and side DEF outlets 97 is 50:50 (=1:1). Thus, the volume of inside air is 175 m$^3$/h and the volume of outside air is also 175 m$^3$/h.

As thus far described, because air inside of the passenger compartment 11 (inside air already heated to a proper temperature) is used and reheated to generate a conditioned air and the conditioned air is blown from the front heat outlets 93 and rear heat outlets 94, the air-conditioned state (heated state) of the passenger compartment 11 can be adjusted with increased efficiency. Furthermore, by merely increasing the rotational speed of the first fan 23, a fog-free state of the windshield 77 and side windowpanes 78 can be maintained reliably and efficiently. The fog-free state of the windshield 77 and side windowpanes 78 can be achieved efficiently while keeping a maximum heat state in the heat mode.

By virtue of a combined effect of the outside air (first warm conditioned air), which is guided into the side vent ducts 82 located adjacent to the side windowpanes 78, the side DEF ducts 87, and the DEF duct 86 located adjacent to the windshield 77, and the inside air (second warm conditioned air) which is guided into the front and rear heat vent ducts 83, 84, a good balance between comfort and ventilating and anti-fogging operation can be achieved with a minimum cooling capacity. The cooling workload on a conditioned air to be blown into the passenger compartment 11 can thus be reduced and, hence, the energy consumption of the vehicle air-condition can be reduced, too.

Furthermore, because of the use of two independently controllable blower motor fans (i.e., the first and second fans 23, 24), the flow volumes (corresponding to the rotational speeds) of these fans 23, 24 can be adjusted for each individual fan. With this arrangement, a ventilating operation and an anti-fogging operation can be achieved with a minimum amount of outside air introduced in the vehicle air-conditioner 15 and, hence, a further reduction in energy consumption can be achieved.

Figure 18A:
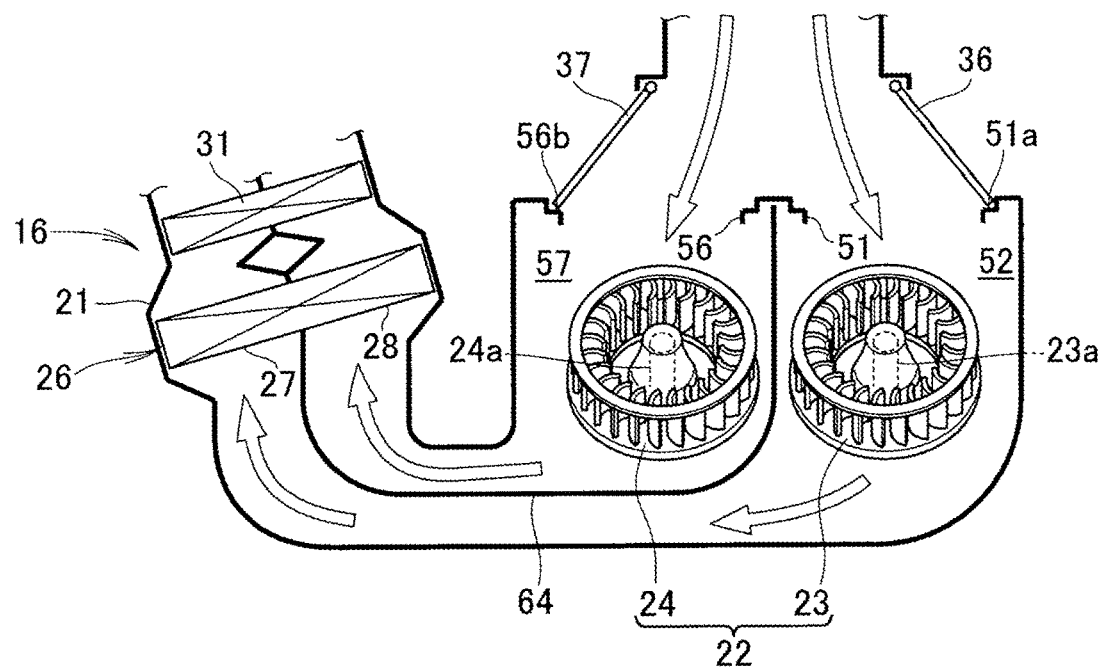
FIG. 18A is a view similar to FIG. 3, but showing a condition in which the vehicle air-conditioner is operating to achieve a maximum anti-fogging state in a defrost mode.
Figure 18B:
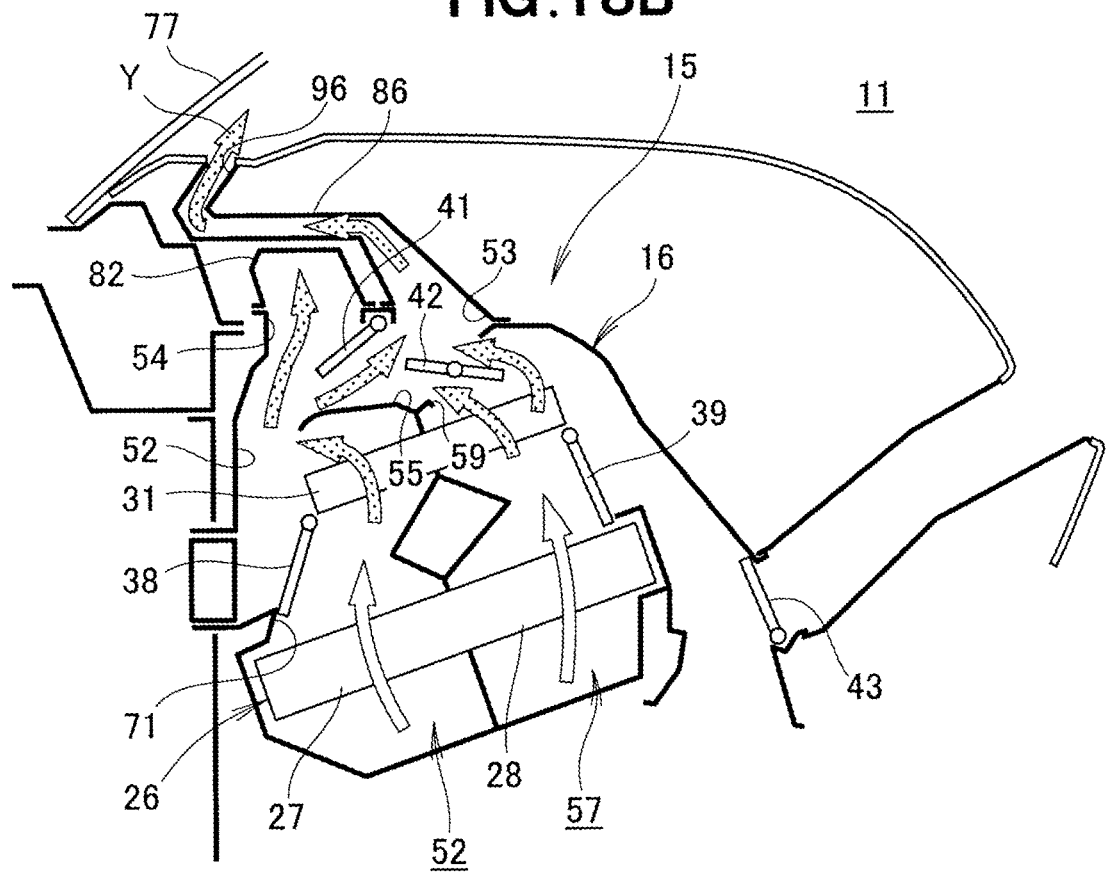
FIG. 18B is a view similar to FIG. 2, but showing a condition in which the vehicle air-conditioner is operating to achieve the maximum anti-fogging state in the vent mode.

Referring next to FIGS. 18A, 18B and 18, a description will be made about an example in which the vehicle air-conditioner 15 is operating in a maximum defogging state in a defrost mode (DEF mode). As shown in FIG. 18A, the second switching damper 37 is shifted from the position shown in FIG. 16A to a position in which it is placed on the second stopper part 56b of the second air inlet 56. As shown in FIG. 18B, the DEF/warm-air switching damper 42 is pivotally moved from the position shown in FIG. 16B to a position to open the side vent connecting hole 59. Under such conditions, the first fan 23 and the second fan 24 are driven and second fans 23 and 24 are driven. By thus rotating the first fan 23, outside air is guided toward the evaporator lower half 27. The outside air then passes across the evaporator lower half 27 whereupon it is conditioned to have a low level of humidity. The thus conditioned outside air is heated and converted into a first warm conditioned air as it passes across the lower half of the heater core 63. The first warm conditioned air has a low level of humidity. A part of the first warm conditioned air is guided from the side vent inlet 54 into the side vent ducts 82

Figure 19:
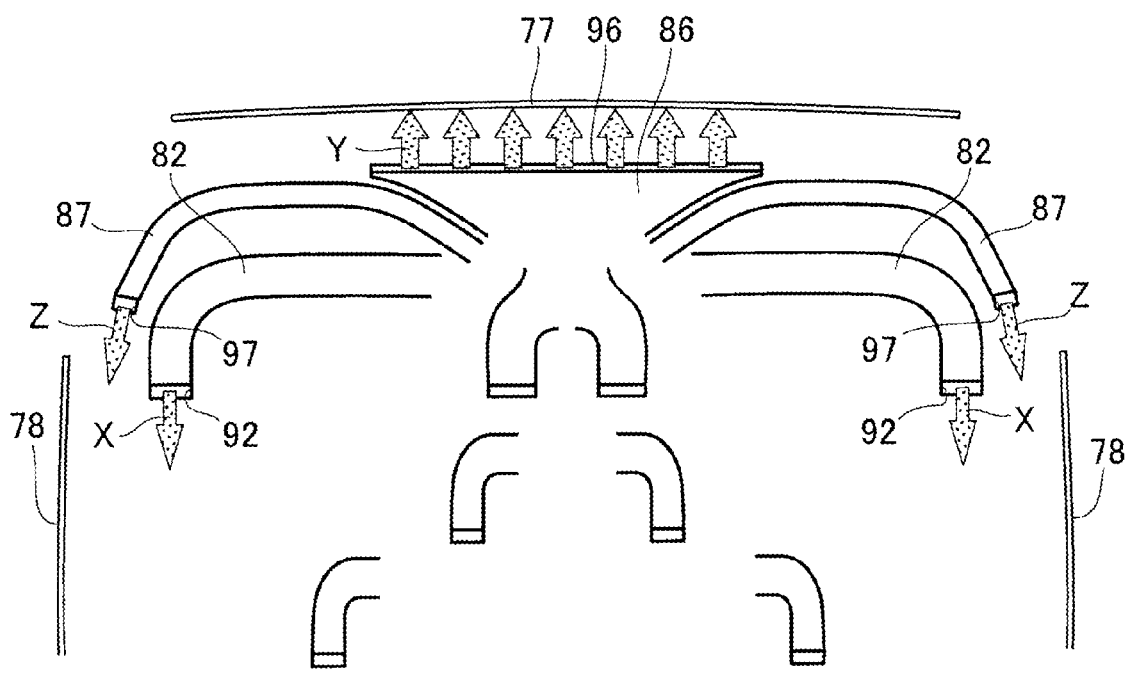
FIG. 19 is a view similar to FIG. 5, but showing a manner in which controlled air is blown from the duct unit when the vehicle air-conditioner is operating in the maximum anti-fogging state in the defrost mode.

As shown in FIG. 19, the first warm conditioned air thus guided in the side vent ducts 82 is blown in large amounts, as a conditioned air, from the side vent outlets 92 into the passenger compartment 11, as indicated by the arrow X. A part of the conditioned air thus blown from the side vent outlets 92 impinges on the inside surfaces of the side windowpanes 78. As shown in FIG. 18B, the remaining part of the first warm conditioned air, which has been heated by the lower half of the heater core 31, is guided toward the DEF inlet 53.

As shown in FIGS. 18A and 18B, rotation of the second fan 24 guides the outside air toward the evaporator upper half 28. The outside air then passes across the evaporator upper half 28 whereupon it is conditioned to have a low level of humidity. The thus conditioned outside air is heated and converted into a second warm conditioned air as it passes across the upper half of the heater core 31. The second warm conditioned air still has a low level of humidity. The second warm conditioned air is guided from the side vent connecting hole 59 into the DEF inlet 53.

The second warm conditioned air guided to the DEF inlet 53 and the first warm conditioned air guided to the DEF inlet 53 are mixed together and a mixture of the first and second warm conditioned airs is distributed in a branched fashion to the DEF duct 86 and the side DEF ducts 87 (FIG. 19). As shown in FIG. 19, that part of the mixture of the first and second warm conditioned airs which is distributed to the DEF duct 86 is blown, as a conditioned air, from the DEF outlet 96 toward the inside surface of the windshield 77, as indicated by the arrow Y. By thus blowing the conditioned air from the DEF outlet 96, a fog-free state of the windshield 77 can be maintained.

That part of the mixture of the first and second warm conditioned airs which is distributed to the side DEF ducts 87 is blown, as a conditioned air, from the side DEF outlets 97 toward the inside surfaces of the side windowpanes 78, as indicated by the arrow Z. By virtue of a combined effect of the conditioned air which is blown from the side DEF outlets 97 and that part of the conditioned air which is blown from the side vent outlets 92 and impinges on the inside surfaces of the side windowpanes 78, a fog-free state of the side windowpanes 78 can be maintained reliably and efficiently.

As thus far described, air outside of the passenger compartment 11 is only used and by heating the outside air with the upper and lower halves of the heater core 31 a first warm conditioned air and a second warm conditioned air are generated. The thus generated first and second warm conditioned airs are mixed together, and a mixture of the first and second warm conditioned air is blown toward the windshield 77 and side windowpanes 78, so that the good anti-fogging properties of the windowpanes including the windshield can be maintained.

Additionally, because of the use of two independently controllable blower motor fans (first and second fans 23, 24), a load per each fan can be reduced to a smaller level as compared to that of conventional air-conditioning units equipped with a single blower motor fan. This arrangement enables the vehicle air-conditioner 15 to operate with higher efficiencies, thus achieving a reduction in energy consumption.

Although only one structural embodiment of the invention has been disclosed and described, it is apparent that other embodiments and modification of the invention are possible. For instance, as to the vehicle 10, passenger compartment 11, vehicle air-conditioner 15, air-conditioning unit 16, first fan 23, second fan 24, evaporator 26, heater core 31, first air inlet 51, first passage 52, second air inlet 56, second passage 57, windshield 77, side windowpanes 78, center vent outlets 91, side vent outlets 92, front and rear heat outlets 93, 94, DEF outlet 96, and side DEF outlets 97, shape, configuration and arrangement should by no means be limited to those shown in the illustrated embodiment, but various changes and modifications are possible where appropriate.

The present invention is particularly advantageous when embodied in a vehicle air-conditioner of the type wherein air inside of the passenger compartment and air outside of the passenger compartment are introduced to generate a conditioned air and the conditioned air is blown into the passenger compartment.

What is claimed is:

1. An air-conditioner for a vehicle, comprising:
a first air inlet for selectively introducing outside air from outside a passenger compartment of a vehicle and inside air from inside the passenger compartment;
a second air inlet for selectively introducing the inside air and the outside air;
a first switching damper for switching opening and closing of the first air inlet;
a second switching damper for switching opening and closing of the second air inlet;
a first passage communicating with the first air inlet;
a second passage communicating with the second air inlet, the second passage being divided by a partition from the first passage along an entire length of the second passage from the second inlet;
an evaporator and a heater core disposed in the first and second passages in the named order as viewed from the first and second air inlets;
a defrost outlet disposed at an upper front portion of an instrument panel of the vehicle;
right and left side defrost outlets disposed at opposite right and left sides of the instrument panel;
right and left side vent outlets disposed at opposite right and left sides of the instrument panel;
a pair of laterally juxtaposed center vent outlets disposed at a central portion of the instrument panel that directs airflow toward a face of a vehicle occupant;
right and left heat outlets disposed at a floor panel of the vehicle;
a side vent/DEFROST switching damper disposed downstream of the heater core; and
a center vent/heater switching damper disposed in the second passage downstream of the heater core,
wherein the side vent/DEFROST switching damper is configured to switchably operate in one of a defrost/side vent position in which the first passage is connected with each of the defrost outlet, the right and left side defrost outlets and the right and left side vent outlets, and a side vent position in which the first passage is connected with only the right and left side vent outlets,
wherein the center vent/heater switching damper is configured to switchably operate in one of a center vent position in which the second passage is connected with only the pair of laterally juxtaposed center vent outlets, a heater position in which the second passage is connected with only the right and left heat outlets, and a center vent/heater position in which the second passage is connected with both the pair of laterally juxtaposed center vent outlets and the right and left heat outlets,
wherein the air-conditioner is configured to operate in plural different modes, including at least a first mode which simultaneously positions:
the first switching damper to direct the outside air through the first air inlet into the first passage to be conditioned into a first conditioned air by the evaporator and the heater core,
the side vent/DEFROST switching damper to the defrost/side vent position thereby directing the first conditioned air from the first passage to the defrost outlet, the right and left side defrost outlets and the right and left side vent outlets toward windowpanes of the vehicle,
the second switching damper to direct the inside air through the second air inlet into the second passage to be conditioned into a second conditioned air by the evaporator and the heater core, and
the center vent/heater switching damper to the center vent/heater position thereby directing the second conditioned air from the second passage to the pair of laterally juxtaposed center vent outlets and the right and left heat outlets into the passenger compartment.

2. The air-conditioner according to claim 1, further comprising:
a first fan disposed in the first passage and located between the first air inlet and the evaporator; and
a second fan disposed in the second passage and located between the second air inlet and the evaporator,
wherein the first fan and the second fan are individually supported on respective driving shafts.

3. The air-conditioner according to claim 1, wherein the evaporator is mounted to tilt in a backward direction of the vehicle, and the tilted evaporator includes a lower half disposed in the first passage and an upper half disposed in the second passage.

4. The air-conditioner according to 1,
wherein the evaporator is mounted to tilt in the backward direction of the vehicle, and the tilted evaporator includes a lower half disposed in the first passage and an upper half disposed in the second passage,
wherein the heater core is mounted to tilt in a backward direction of the vehicle and parallel to the evaporator, and the tilted heater core includes a lower half disposed in the first passage and an upper half disposed in the second passage.

5. The air-conditioner according to claim 4, further comprising:
a first fan disposed in the first passage and located between the first air inlet and the evaporator; and
a second fan disposed in the second passage and located between the second air inlet and the evaporator,
wherein the first fan and the second fan are individually supported on respective driving shafts.

6. The air-conditioner according to claim 4,
wherein the side vent/DEFROST switching damper is disposed above the heater core, and
wherein the center vent/heater switching damper disposed in the second passage is located rearwardly of the evaporator upper half as viewed in a longitudinal direction of the vehicle.

7. The air-conditioner according to claim 6, further comprising:
a first fan disposed in the first passage and located between the first air inlet and the evaporator; and
a second fan disposed in the second passage and located between the second air inlet and the evaporator,
wherein the first fan and the second fan are individually supported on respective driving shafts.

* * * * *